United States Patent
Yuasa et al.

(10) Patent No.: US 8,558,137 B2
(45) Date of Patent: Oct. 15, 2013

(54) STRUCTURE, METHOD OF FORMING STRUCTURE, AND METHOD OF LASER PROCESSING OBJECTS

(75) Inventors: Yoshiyuki Yuasa, Yokohama (JP); Ken Takenouchi, Yokohama (JP); Hitomi Kuroda, Yokohama (JP); Nobuo Hirakawa, Yokohama (JP); Hiroko Hosono, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 162 days.

(21) Appl. No.: 12/736,703

(22) PCT Filed: May 1, 2009

(86) PCT No.: PCT/JP2009/058544
§ 371 (c)(1),
(2), (4) Date: Nov. 2, 2010

(87) PCT Pub. No.: WO2009/136598
PCT Pub. Date: Nov. 12, 2009

(65) Prior Publication Data
US 2011/0058171 A1    Mar. 10, 2011

(30) Foreign Application Priority Data

May 7, 2008 (JP) .................................. 2008-121561
Jun. 23, 2008 (JP) .................................. 2008-163734

(51) Int. Cl.
B23K 26/00 (2006.01)

(52) U.S. Cl.
USPC .................................................. 219/121.68

(58) Field of Classification Search
USPC .................... 359/2, 567; 283/86; 219/121.61, 219/121.68, 121.69
See application file for complete search history.

(56) References Cited

U.S. PATENT DOCUMENTS

| 4,560,249 A * | 12/1985 | Nishiwaki et al. ................. 359/3 |
| 6,994,937 B2 * | 2/2006 | Toshine et al. ................... 430/1 |
| 2003/0124436 A1 * | 7/2003 | Shioda et al. ..................... 430/1 |
| 2006/0173421 A1 | 8/2006 | Weber et al. |
| 2009/0103150 A1 * | 4/2009 | Heierli et al. ..................... 359/2 |

FOREIGN PATENT DOCUMENTS

| JP | H05-092657 | 4/1993 |
| JP | H06-198466 | 7/1994 |
| JP | 2001-191692 | 7/2001 |
| JP | 2002-273832 A | 9/2002 |

(Continued)

OTHER PUBLICATIONS

Japan Patent Office, "Office Action for JP 2009-120545", Jul. 23, 2013.

(Continued)

Primary Examiner — Alessandro Amari
(74) Attorney, Agent, or Firm — Manabu Kanesaka

(57) ABSTRACT

A structural body has an inner layer formed of a resin which does not transmit light with a specific wavelength, an outer layer stacked on the inner layer and formed of a resin which transmits the light with the specific wavelength, and a fine periodic structure provided on at least part of a surface of the inner layer facing the outer layer and having a plurality of photodecomposition generated convex and concave portions. The plurality of convex and concave portions of the fine periodic structure is formed alternatively, and horizontally and vertically with substantially equal intervals in between along the surface of the inner layer facing the outer layer.

24 Claims, 20 Drawing Sheets

(56) References Cited

FOREIGN PATENT DOCUMENTS

| | | |
|---|---|---|
| JP | 2003-320585 | 11/2003 |
| JP | 2007-175778 | 7/2007 |
| JP | 2007-210166 A | 8/2007 |
| JP | 2008-126283 A | 6/2008 |

OTHER PUBLICATIONS

Japan Patent Office, "Office Action for JP 2008-121561", Jun. 25, 2013.

* cited by examiner (Formed of a high-molecular compound)

(UV rays are irradiated)

(Modified)

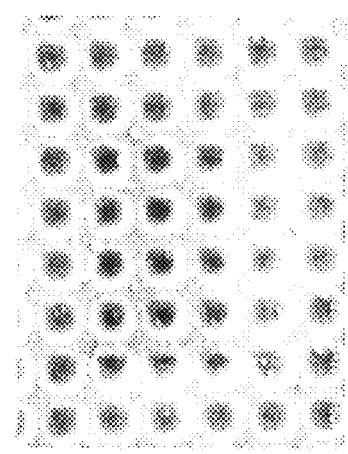
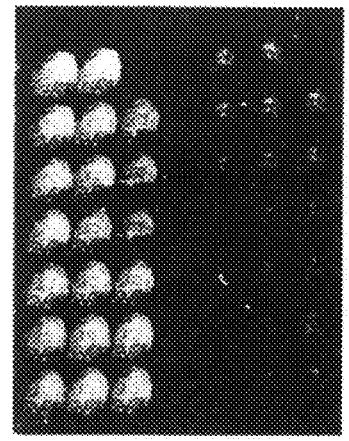
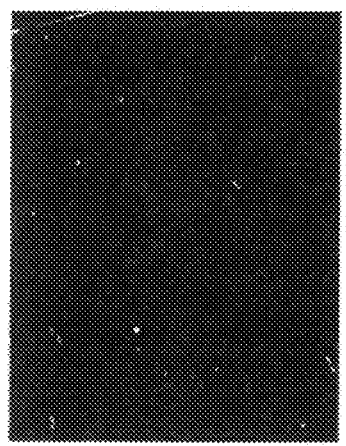
FIG. 25

STRUCTURE, METHOD OF FORMING STRUCTURE, AND METHOD OF LASER PROCESSING OBJECTS

RELATED APPLICATIONS

The present application is National Phase of International Application No. PCT/JP2009/058544 filed May 1, 2009, and claims priorities from Japanese Applications No. 2008-121561 filed May 7, 2008 and No. 2008-163734 filed Jun. 23, 2008, the disclosure of which is hereby incorporated by reference herein in its entirety.

TECHNICAL FIELD

The present invention relates to a structural body which is an object of laser processing, a method for forming a structural body which is the procedure of forming this structural body, and a method for laser processing in which a predetermined processing is conducted by irradiating laser light. In particular, the present invention relates to a structural body on which marking is made by the irradiation of laser light, and a method for forming a structural.

BACKGROUND ART

Laser marking is a technique of providing various industrial products with characters, signs, markings, etc. by irradiating laser light.

Due to such advantages as good appearance, almost no possibility of being deteriorated, a short processing time, and labor-saving properties, the laser marking has been adopted in various fields.

Laser marking was generally performed on the surface of a product. Therefore, if the surface is marred or fouled, etc, a good appearance might not be obtained. Moreover, due to the fear of falsification or erasion, there was also a problem that important data could not be drawn.

Under such circumstances, a technique has been proposed to prevent laser marking from being marred or fouled, and further, from falsified or erased, has been proposed.

For example, a technique has been proposed in which, while stacking a protective layer through which laser light can transmit on a resin matrix on which characters or patterns can be formed by irradiation of laser light, the surface of the resin matrix is irradiated with laser light, whereby characters or patterns are formed (for example, see Patent Document 1).

According to this technique, since characters or patterns are protected by the protective layer, these characters and patterns are prevented from being marred or fouled, and further, prevented from being falsified or erased.

Although laser marking is conducted on many industrial products, it is difficult to conduct laser making on a high-molecular processed product (plastics) which transmits laser light.

The reason therefor is that, in such an object to be processed, since only small amount of laser light is absorbed, an interaction of light and a substance (for example, light-and-heat conversion) is hard to occur.

Under such circumstances, a technology has been proposed which enables laser marking also for an object to be processed consisting of a high-molecular processed product which transmits laser light.

For example, a technology has been proposed in which a substance having a large absorption for laser light (light absorption agent) is dispersed in an object to be processed or applied to the surface of an object to be processed (for example, see Patent Document 2).

According to this technology, since absorptivity of laser light is increased by a substance dispersed or applied, laser marking becomes possible. In particular, in the case of a shaped product coated with a thermoplastic resin composition which contains a specific amount of carbon black, laser marking with a clear contrast becomes possible.

Moreover, a technology has been proposed in which a transparent body, the bottom surface of which is in contact with a solution having a high laser light absorptivity, is irradiated with laser light which has been condensed by means of a lens from the upper surface thereof, and the relative position of the lens and the transparent body are changed such that, as a hole formed in the interface of the transparent body which contacts the solution advances into the inside of the transparent body, the focus of laser light matches the deepest part of the hole, thereby etching a transparent body (see Patent Document 3, for example).

According to this technology, since the laser light, which has passed without being absorbed by the transparent body is absorbed by a solution, laser energy is caused to transmit indirectly to the transparent body which is in contact with this solution, whereby the surface of that transparent body can be etched.

RELATED ART DOCUMENTS

Patent Documents

Patent Document 1 JP-A-2001-191692
Patent Document 2 JP-A-H05-92657
Patent Document 3 JP-A-2007-175778

SUMMARY OF THE INVENTION

Problems to be Solved by the Invention

However, the technologies disclosed in Patent Documents 1 to 3 mentioned above had the following problems.

For example, in the technology disclosed in Patent Document 1, characters or patterns are formed by using laser light for irradiation having a wavelength in the infrared region and by providing a thermal energy to cause carbonization, foaming or evaporation.

Here, when carbonization is caused, the amount of the oxygen to be supplied is required to be restricted or controlled. However, since the interface of a resin matrix and a protective layer did not contact the open air, the amount of oxygen could not be adjusted and hence a carbonization phenomenon could not be caused to occur. For this reason, marking by carbonization of an interface was difficult to realize.

Moreover, when foaming is caused by infrared light irradiation, air bubbles are generated in a polymer by the chemical reaction of a light absorbing body and a foaming agent. When an attempt is made to conduct marking on the interface of the inner layer of a multilayer body, the interface may be open by the pressure of bubbles generated, thereby to deform the laminated body. For this reason, marking by foaming was not practical.

Furthermore, evaporation is not suited to marking due to significantly poor contrast since etching is conducted by degradation of a polymer.

Further, in the case of marking by carbonization, foaming, or evaporation, the marked portion has only one color, and the color thereof is limited.

For example, in the case of carbonization, the color was brown, gray or black.

In the case of foaming, the color was white.

In the case of evaporation, the color was white, brown, gray or black in concave parts.

As mentioned above, even if marking is conducted using the technology disclosed in Patent Document 1, it was impossible to give a wide variety of colors.

Moreover, in the case of the technology disclosed in the Patent Document 2, need of a light-absorbing agent leads to an increase in cost.

Further, the additional process of dispersing or applying a light absorbing agent makes the entire process complicated.

Since a transparent object to be processed would become black if carbon black is used as a light-absorbing agent, it was impossible to put it on the market in the transparent state.

Moreover, since the technology disclosed in Patent Documents 3 requires an advanced level of technology of changing the relative position of a lens and a transparent body so that the focus of laser light can match the deepest part of the hole, it was not practical.

Furthermore, need of a light-absorbing agent solution leads to an increase in cost.

The present invention has been made in view of the above-mentioned circumstances. An object of the present invention is to provide a structural body which can be prevented from being marred, fouled, falsified or erased and which can be marked in various colors by surely conducting laser marking in the second or subsequent layers of the structural body having a multilayer structure, a method for forming a structural body, a method for laser processing and a method for discriminating between true and false objects.

Further, the present invention has been made in view of the above-mentioned circumstance. An object thereof is to provide a structural body which is capable of conducting laser marking on an object to be processed containing, in at least part thereof, plastic which transmits laser light easily by a simple method without using a light-absorbing agent, a light-absorbing solution or the like, a method for forming a structural body, a method for laser processing and a method for discriminating between true and false objects.

Means for Solving the Problem

In order to attain this objects, the structural body of the present invention has a configuration in which an inner layer and an outer layer are stacked, the inner layer is formed of a resin which does not transmit light with a specific wavelength, the outer layer is formed of a resin which transmits light with the specific wavelength, and at least part of the surface of the inner layer which is opposed to the outer layer has a fine periodic structure in the form of convexes and concaves formed by generation of photodecomposition.

The structural body of the present invention has a configuration in which it comprises an inner layer and an outer layer stacked, wherein said outer layer is formed of a resin which transmits light with a specific wavelength, the inner layer is formed of different resins being stacked, at least one layer of the thus stacked inner layers is formed of a resin which does not transmit light with a specific wavelength, and, of the surfaces of said at least one layer, a fine periodic structure in the form of convexes and concaves formed by generation of photodecomposition is formed on at least part of the surface which is opposed to the outer layer.

The structural body of the present invention has a structure in which an outer layer is stacked on both surfaces of an inner layer, a first outer layer is formed on one surface of said inner layer and a second outer layer is formed on the other surface of the inner layer, wherein said inner layer is formed of a resin which does not transmit light with a specific wavelength, said first outer layer and/or said second outer layer are formed of a resin which transmits light with said specific wavelength, and, of the surfaces of said inner layer, a fine periodic structure in the form of convexes and concaves formed by generation of photodecomposition is formed on at least part of the surface opposed to the first outer layer and/or on at least part of the surface opposed to the second outer layer.

The structural body of the present invention has a structure in which an outer layer is stacked on both surfaces of an inner layer, a first outer layer is formed on one surface of said inner layer and a second outer layer is formed on the other surface of said inner layer, wherein the first outer layer and/or the second outer layer are formed of a resin which transmits light with a specific wavelength, said inner layer is formed of different resins stacked one on another, at least one layer of the thus stacked inner layers is formed of a resin which does not transmit light with said specific wavelength, and of the surfaces of said one layer, a fine periodic structure in the form of convexes and concaves formed by generation of photodecomposition is formed on at least part of the surface which is opposed to said first outer layer and/or at least part of the surface which is opposed to said second outer layer.

The structural body of the present invention has a structure in which it has a high-molecular compound which transmits laser light in at least part thereof, wherein at least part of said high-molecular compound is irradiated with light to allow it to be modified such that absorptivity for said laser light can be enhanced.

The method for forming a structural body of the present invention is a method wherein a structural body which at least has an outer layer formed of a resin which transmits light with a specific wavelength and an inner layer formed of a resin which does not transmit light with said specific wavelength is irradiated with light with said specific wavelength through said outer layer to said inner layer, and of the surfaces of said inner layer, photodecomposition is generated in at least part of the surface opposed to said outer layer, whereby a fine periodic structure in the form of convexes and concaves is formed.

The laser processing method according to the present invention is a method in which laser processing is conducted on an object to be processed, wherein said object to be processed has, in at least part thereof, a high-molecular compound which transmits laser light, at least part of said high-molecular compound is irradiated with light to allow it to be modified, and said modified part is irradiated with said laser light to conduct a predetermined processing.

The method for discriminating between true and false objects of the present invention is a method in which an object to be processed or an object to be judged to which this object to be processed is attached is judged whether it is a true product or not by using a structural body with a multilayer structure, which comprises the steps of: irradiating at least part of an object to be processed which is to be judged as a true product with laser light, thereby to conduct first marking on the surface of an inner layer of said object to be processed and conduct second marking on the exposed surface of an outer layer, and, judging true or false in such a way that if said first marking appears when development of a structural color by said second marking is suppressed, it is judged that said object to be processed or said object to be judged to which said object to be processed is attached is a true product, and if said first marking does not appear, a functional material is applied on the exposed surface of said outer layer in order to admit that said object to be processed or said object to be judged to which said object to be processed is attached is a counterfeit product.

The method for discriminating between true and false objects of the present invention is a method in which an object to be processed or an object to be judged to which this object to be processed is attached is judged whether it is a true product or not by using a structural body with a multilayer structure, which comprises the steps of: irradiating at least part of an object to be processed which is to be judged as a true product with laser light, thereby to conduct first marking on the surface of an inner layer of said object to be processed and conduct second marking on the exposed surface of an outer layer, and, judging true or false in such a way that if said first marking which appears when development of a structural color by said second marking is suppressed has a predetermined shape, it is judged that said object to be processed or said object to be judged to which said object to be processed is attached is a true product, and if said first marking which appears does not have a predetermined shape, a functional material is applied On the exposed surface of said outer layer in order to admit that said object to be processed or said object to be judged to which said object to be processed is attached is a counterfeit product.

The method for discriminating between true and false objects of the present invention is a method in which an object to be processed or an object to be judged to which this object to be processed is attached is judged whether it is a true product or not, which comprises the steps of: preparing by irradiating at least part of the object to be processed with laser light to allow it to be modified, and judging true or false in such a way that when marking is conducted on said object to be processed which is judged as a true product by irradiating the object to be processed with light, it is judged that said object to be processed or said object to be judged to which said object to be processed is attached is a true product, and when marking is not conducted, it is judged that said object to be processed or said object to be judged to which said object to be processed is attached is a counterfeit product.

The method for discriminating between true and false objects of the present invention is a method in which an object to be processed or an object to be judged to which this object to be processed is attached is judged whether it is a true product or not by irradiating laser light, which comprises the steps of: preparing by irradiating the object to be processed which is to be judged as a true product with light through a shielding plate having an opening formed in the shape of a character or a figure, thereby to modify said object to be processed, and judging true or false in such a way that when marking is conducted in a shape of a character or a figure which is the same as that of said opening when said object to be processed is irradiated with laser light, it is judged that said object to be processed or the object to be judged to which this object to be processed is attached is a true product and when marking is not conducted or conducted in a shape which is different from the predetermined shape, it is judged that that said object to be processed or the object to be judged to which this object to be processed is attached is a counterfeit product.

The method for discriminating between true and false objects of the present invention is a method in which an object to be processed or an object to be judged to which this object to be processed is attached is judged whether it is a true product or not by illuminating which comprises the true-false judging steps of: preparing by irradiating at least part of an object to be processed which is to be judged as a true product with light, thereby to modify said object to be processed, and judging true or false in such a way that if shade appears in the transmitted light or reflected light when said object to be processed is illuminated, it is judged that said object to be processed or said object to be judged to which said object to be processed is attached is a true product, or if shade does not appear, it is judged that said object to be processed or said object to be judged to which said object to be processed is attached is a counterfeit product.

The method for discriminating between true and false objects of the present invention is a method in which an object to be processed or an object to be judged to which this object to be processed is attached is judged whether it is a true product or not by illuminating which comprises the steps of: preparing by irradiating an object to be processed which is to be judged as a true product with light through a shielding plate having an opening formed in the shape of a character or a figure, thereby to modify said object to be processed, and judging true or false in such a way that if shade appears in a shape of a character or a figure which is the same as that of said opening in the transmitted light or reflected light when said object to be processed is illuminated, it is judged that said object to be processed or said object to be judged to which said object to be processed is attached is a true product, or if shade does not appear or shade appears in a shape different from the predetermined shape, it is judged that said object to be processed or said object to be judged to which said object to be processed is attached is a counterfeit product.

Advantageous Effects of the Invention

According to the structural body, the method for forming a structural body, the method for laser processing, and the method for discriminating between true and false objects of the present invention, if a structural body having an outer layer which transmits light with a specific wavelength and an inner layer which does not transmit light with the specific wavelength is irradiated with laser light with the specific wavelength, this laser light transmits the outer layer to reach the inner layer and generates photodecomposition on the surface of the inner layer, whereby a fine periodic structure in the form of convexes and concaves can be formed. As a result, laser marking can be conducted without fail on the second or subsequent layers of a structural body having a multilayer structure.

Since the first layer serves as a protective layer, a marked part is not exposed to open air. As a result, a marked part can be resistant to marring or fouling, thereby to prevent deterioration of coloring, and further, falsification or erasion of a marked part can be prevented.

Since marking is formed of a fine periodic structure in the form of concaves and convexes, marking can be conducted in various colors which are equivalent to those of a hologram.

According to the structural body, the method for forming a structural body, the method for laser processing, and the method for discriminating between true and false objects of the present invention, a high-molecular compound constituting an object to be processed is modified by irradiation of light, and the laser light absorptivity can be enhanced. As a result, even in the case of an object to be processed which contains a high-molecular compound which transmits laser light in at least one part thereof, laser marking can be conducted easily on this high-molecular compound.

Furthermore, since laser light absorptivity is increased by light irradiation, there is no need to use a light-absorbing agent, which prevents an increase in cost. In addition, since there is no need to disperse or apply a light-absorbing agent, the working process can be simplified.

Furthermore, since laser light absorptivity is increased by light irradiation, the transparency of an object to be processed is not deteriorated, and hence, the object to be processed can be processed into a product while keeping the transparent state.

BRIEF DESCRIPTION OF THE DRAWINGS

FIG. 25 is an enlarged view showing an appearance of an object to be processed after irradiation of laser light, in which (i) shows the state where no UV rays are irradiated; and (ii) shows the state where UV rays are irradiated in advance; and (iii) is an SEM image of (ii);

BEST MODE FOR CARRYING OUT THE INVENTION

A preferred embodiment of the structural body, the method for forming a structural body, the method for laser processing and the method for discriminating true and false objects of the present invention will be explained hereinbelow with reference to the drawings.

[Structural Body]

First, the embodiment of the structural body of the present invention will be explained with reference to FIG. 1 and FIG. 2.

Figure 1:
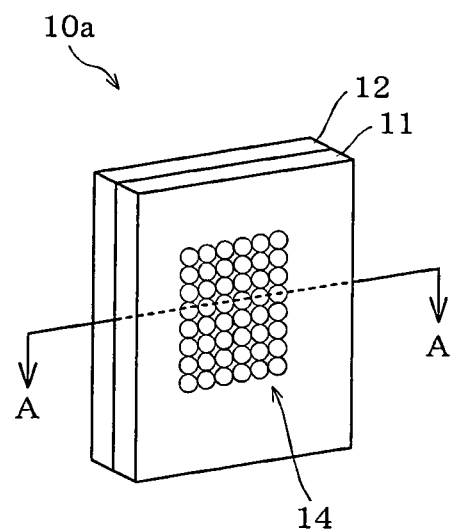
FIG. 1 is a perspective view which diagrammatically shows the structure of the structural body of this embodiment.

FIG. 1 is an external perspective view showing the structure of the structural body of this embodiment. FIG. 2 is a cross-sectional view taken along the line A-A of the structural body shown in FIG. 1.

The structural body may have a multilayer structure formed of a plurality of layers.

Here, when the structural body is formed of two layers, as shown in FIG. 1, it has an outer layer 11 and an inner layer 12.

The outer layer 11 is formed of a resin which transmits light with the specific wavelength.

The inner layer 12 is formed of a resin which does not transmit light with a specific wavelength.

The above-mentioned transmissibility and non-transmissibility are defined as follows.

The "transmissibility" is defined as the capability of transmitting light with a specific wavelength of 70% or more, the "semi-transmissibility" is defined as the capability of transmitting light with a specific wavelength of 10% or more and less than 70%, and the non-transmissibility is defined as the capability of transmitting light with a specific wavelength of less than 10%.

Figure 3:
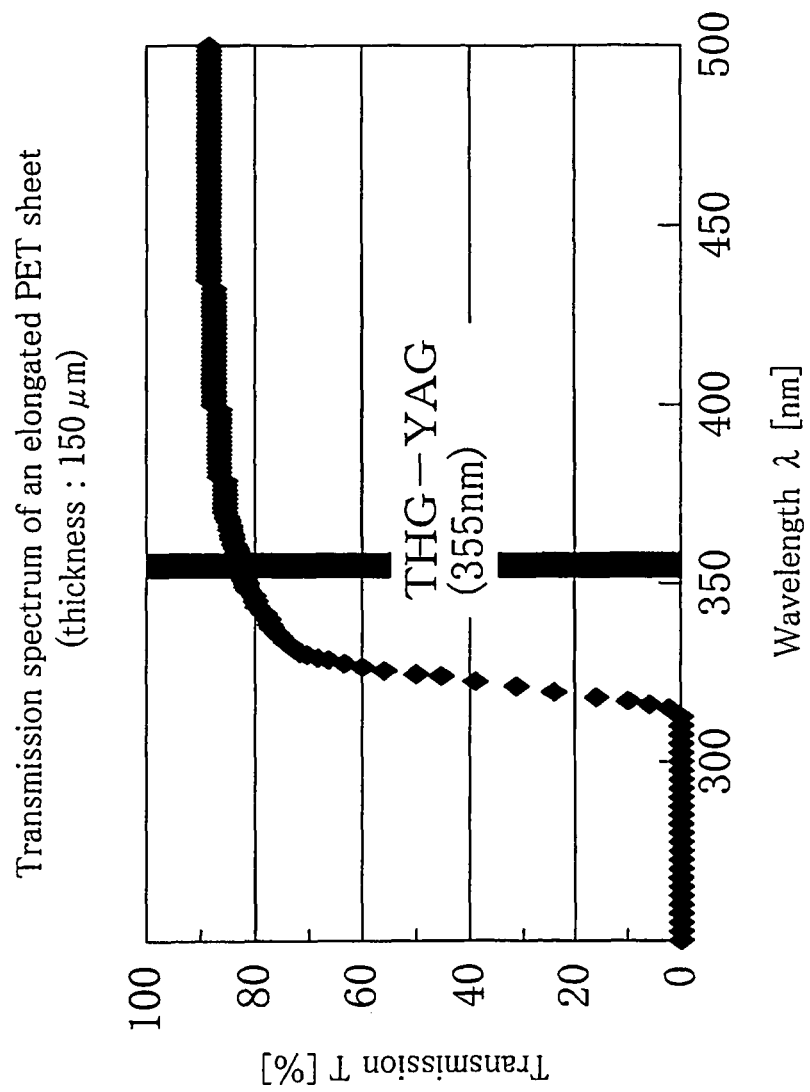
FIG. 3 is a graph showing a transmission spectrum of an elongated PET sheet.

As specific examples, an explanation is made on an elongated PET (PET: Polyethylene Terephthalate) sheet. As shown in FIG. 3, since it has transmission of 70% or more for light with a wavelength of about 330 nm or more, an elongated PET sheet has transmissibility. In addition, since it has transmission of 10% or more and less than 70% for light with a wavelength of around 320 nm, an elongated PET sheet has semi-transmissibility. Further, since it has transmission of less than 10% for light with a wavelength of about 310 nm or less, an elongated PET sheet has non-transmissibility.

If an object shows transmissibility for light with a certain wavelength, the light with this wavelength penetrates to the inside of this object. On the other hand, if an object shows non-transmissibility, the light penetrates to only the vicinity, of the surface of this object.

Figure 2:
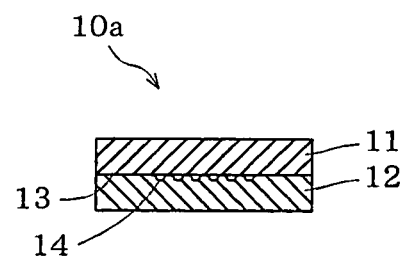
FIG. 2 is a cross-sectional view which diagrammatically shows the structure of the structural body of this embodiment.

As shown in FIG. 2, a fine periodic structure 14 which generates optical diffraction is formed in the entire or part of a surface 13 nearer to the outer layer of the inner layer 12 (the part nearer to the inner layer in the interface between the outer layer 11 and the inner layer 12). The fine periodic structure 14 has a regular arrangement which develops a structural color.

Here, the "regular arrangement which develops a structural color" as referred to herein means an arrangement in which the cycle of the lattice is close to a visible light wavelength (about 400 nm to 700 nm).

FIGS. 4 to 7 each show an enlarged view of this fine periodic structure 14.

Figure 4:
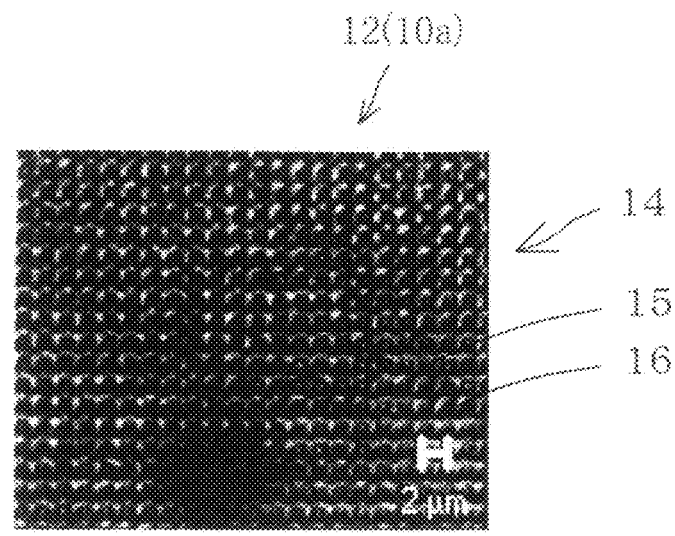
FIG. 4 is a transmission electron microscopic photograph showing an enlarged view of the inner layer surface of a structural body.
Figure 5:
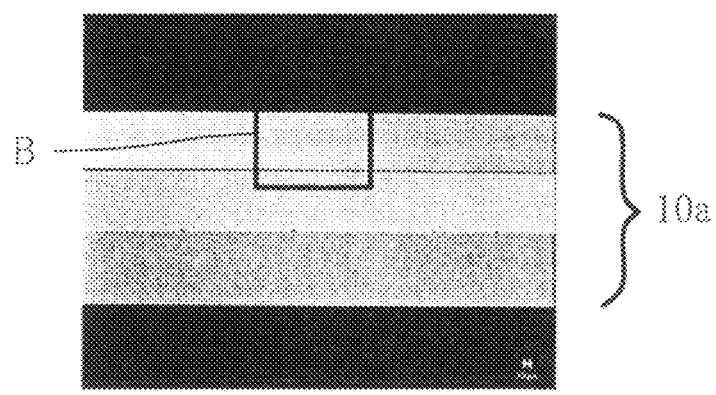
FIG. 5 is a reflection microscopic photograph showing an enlarged view of the cross section of a structural body.
Figure 6:
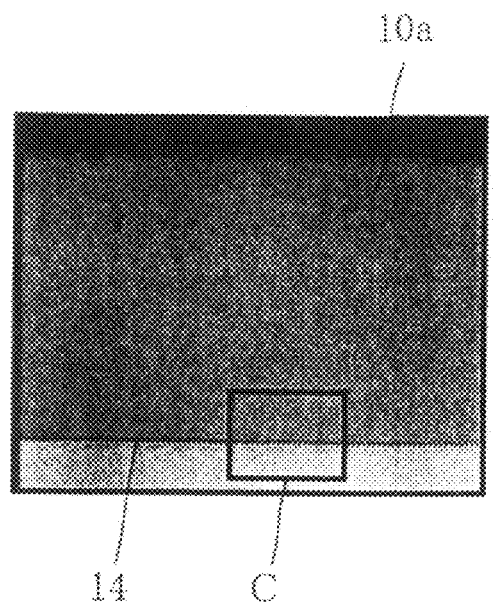
FIG. 6 is a reflection microscopic photograph showing an enlarged view of the B part of the cross section of the structural body shown in FIG. 5.
Figure 7:
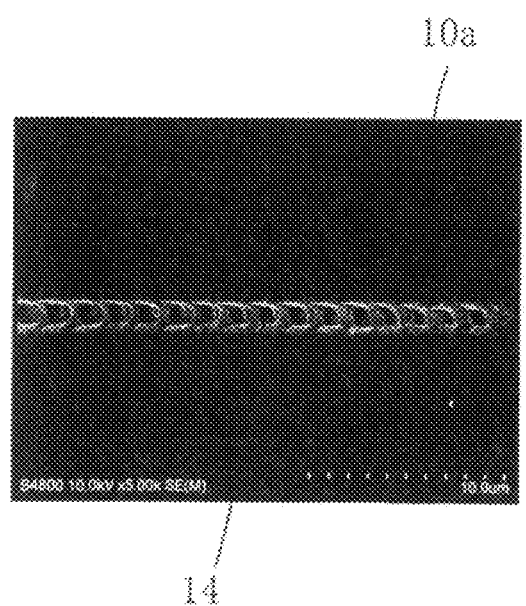
FIG. 7 is a SEM view showing an enlarged view of the C part of the cross section of the structural body shown in FIG. 6.

FIG. 4 is a transmission optical microscopic image showing an enlarged view of a portion of the surface 13 nearer to the outer layer of the inner layer 12 in which the fine periodic structure 14 is formed. FIG. 5 is a reflection optical microscopic image showing an enlarged view of the cross section of the structural body 10a. FIG. 6 is a reflection optical microscopic image which shows an enlarged view of the part B in the reflection optical microscopic image of FIG. 5. FIG. 7 is an SEM image (a scanning electron microscopic image) which shows an enlarged view of the part C in the reflection optical microscopic image of FIG. 6.

As shown in FIG. 4, in the fine periodic structure 14, concave parts 15 and convex parts 16 are formed continuously, regularly and alternatively at almost equal intervals along the surface 13 nearer to the outer layer of the inner layer 12. Since the interval of the concave parts 15 or the interval of the convex parts 16 is close to a visible light wavelength, it develops a structural color.

One cycle (distance between each peak of the adjacent convex parts 16) of this fine periodic structure 14 is about 1.0 to 2.0 μm.

Moreover, the fine periodic structure 14 is formed in the interface of the inner layer of a multilayer structure as shown in FIG. 5 to FIG. 7.

In the image of FIG. 4 to FIG. 7, as the structural body 10a, a three-layered extrusion sheet is used in which the inner layer 12 is formed of PEN, the first outer layer 11-1 and the second outer layer 11-2 are each formed of PET. The structural body 10a is, however, not limited thereto. Any material is possible as far as the fine periodic structure 14 is formed by irradiation of light.

Furthermore, the fine periodic structure 14 is formed in a light-irradiated part of the surface 13 nearer to the outer layer of the inner layer 12. That is, if part of the surface 13 nearer to the outer layer is irradiated with light, the fine periodic structure 14 can be formed in that part. Further, if the entire surface 13 nearer to the outer layer is irradiated with light, the fine periodic structure 14 can be formed in that entire surface. However, if the fine periodic structure 14 is formed entirely in the surface 13 nearer to the outer layer, it is desirable that light be irradiated at a plurality of portions without providing intervals according to the area of the surface 13 nearer to the outer surface.

As mentioned above, the structural body 10a of this embodiment has a structure in which the fine periodic structure 14 is formed on the surface 13 nearer to the outer surface of the inner layer 12. Marking is conducted by causing a structural color to be developed from this fine periodic structure 14 by optical phenomenon, such as diffraction and interference.

Here, the marking as referred to herein means a region in which a structural color and/or diffraction light is developed is uniformly formed or a figure, a character or the like which is drawn by appropriately arranging a part which develops a structural color and/or diffraction light.

If this fine periodic structure 14 is formed on the surface 13 nearer to the outer layer of the inner layer 12, since the outer layer 11 serves as a protective layer, not only the fine periodic structure 14 can be prevented from being marred or fouled, but also erasion or falsification becomes impossible.

In addition, since the periodic structure formed has a shape of convexes and concaves, the developed color is not monochromic, but various colors like a hologram are developed.

Figure 8:
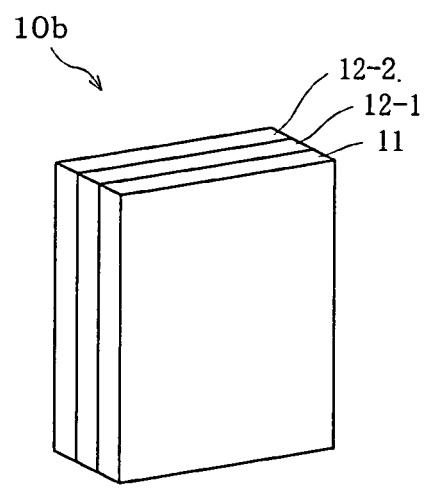
FIG. 8 is a perspective view showing the appearance of a three-layered structural body.

Further, the structural body 10 may have a three-layer structure. In this case, a structural body 10b can be formed on the outer layer 11, a first inner layer 12-1 and a second inner layer 12-2, as shown in FIG. 8.

Figure 9:
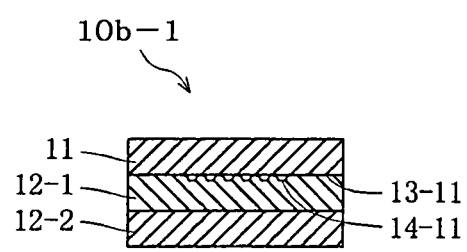
FIG. 9 is a cross-sectional view diagrammatically showing the structure of a structural body in which a fine periodic structure is formed on the surface nearer to the outer surface of the first inner layer.
Figure 10:
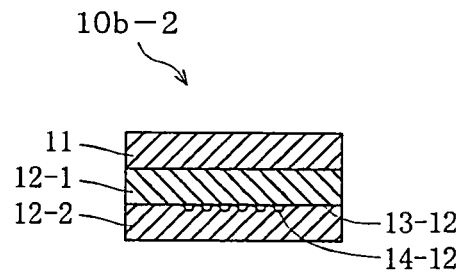
FIG. 10 is a cross-sectional view diagrammatically showing the structure of a structural body in which a fine periodic structure is formed on the surface nearer to the outer surface of the second inner layer.
Figure 11:
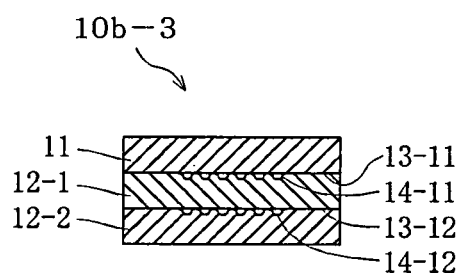
FIG. 11 is a cross-sectional view diagrammatically showing the structure of a structural body in which a fine periodic structure is formed on both of the surface nearer to the outer surface of the first inner layer and the surface nearer to the outer surface of the second inner layer.

At this time, the fine periodic structure 14 can be formed on a surface 13-11 nearer to the outer layer of the first inner layer 12-1, as shown in FIG. 9. In addition, as shown in FIG. 10, the fine periodic structure 14 can be formed on a surface 13-12 nearer to the outer layer of the second inner layer 12-2. Further, as shown in FIG. 11, the fine periodic structure can be formed on both of the surface 13-11 nearer to the outer layer of the first inner layer 12-1 and the surface 13-12 nearer to the outer layer of the second inner layer 12-2. The first inner layer 12-1 and the second inner layer 12-2 are formed of different resins.

Figure 12:
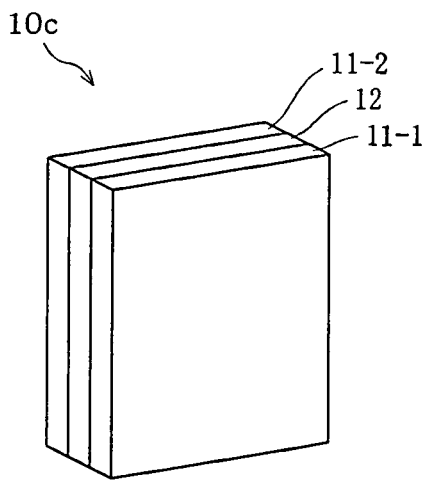
FIG. 12 is a perspective view showing the appearance of a three-layered structural body.

Further, as shown in FIG. 12, a structural body 10c may have a three-layer structure of a first outer layer 11-1, the inner layer 12 and the second outer layer 11-2. That is, the outer layer 11 is stacked on both sides of the inner layer 12, with the first outer layer 11-1 being formed on one side and the second outer layer 11-2 being formed on the other side.

Figure 13:
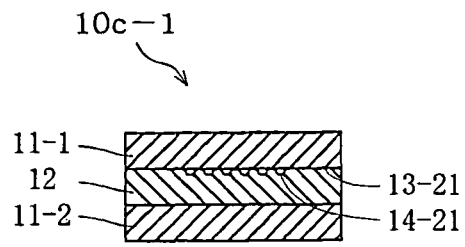
FIG. 13 is a cross-sectional view diagrammatically showing the structure of a structural body in which a fine periodic structure is formed on the surface nearer to the first outer layer of the inner layer.
Figure 14:
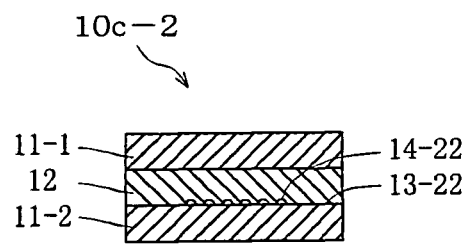
FIG. 14 is a cross-sectional view diagrammatically showing the structure of a structural body in which a fine periodic structure is formed on the surface nearer to the second outer surface of the inner layer.
Figure 15:
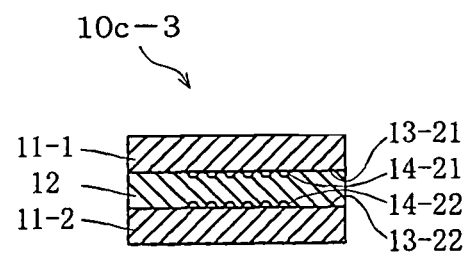
FIG. 15 is a cross-sectional view diagrammatically showing the structure of a structural body in which a fine periodic structure is formed on both the surface nearer to the first outer layer and the surface nearer to the second outer layer of the inner layer.

In this case, as shown in FIG. 13, the fine periodic structure 14 may be formed on the surface 13-21 nearer to the first outer layer of the inner layer 12. In addition, as shown in FIG. 14, the fine periodic structure can be formed on the surface 13-22 nearer to the second outer layer of the inner layer 12. Further, as shown in FIG. 15, the fine periodic structure can be formed on both the surface 13-21 nearer to the first outer layer of the inner layer 12 and the surface 13-22 nearer to the second outer layer of the inner layer 12.

The difference between the structural body 10b shown in FIG. 8 and the structural body 10c shown in FIG. 12 is that the third layer is the inner layer 12 or the outer layer 11.

That is, if the fine periodic structure 14 is formed on the third layer (the case shown in FIG. 10 and FIG. 11), this third layer becomes the inner layer (the second inner layer 12-2), whereby the structural body 10b is configured. On the other hand, if no fine periodic structure 14 is formed on the third layer but formed on the side nearer to the third layer of the second layer (the case shown in FIG. 14 and FIG. 15), the third layer becomes the outer layer (the second outer layer 11-2), whereby the structural body 10c is configured.

As shown in FIG. 9 and FIG. 13, when the fine periodic structure 14 is formed on only on the side nearer to the (first) outer layer 11 of the inner layer 12, the third layer may or may not have transmissibility.

The structural body 10 can be formed of four or more layers. In this case, as the inner layer 12, two or more layers differing in resin are stacked (the first inner layer 12-1 to 12-n), and the outer layer 11 is stacked on one or both sides of these stacked two or more layers.

The fine periodic structure 14 can be formed on the surface 13-1n nearer to the outer layer in the layer 12 which is at least lest one of the first inner layer 12-1 to the nth inner layer 12-n (if two or more outer layers 11 are present, the fine periodic structure can be formed on one or both of the surface 13-21 nearer to the first outer layer or the surface 13-22 nearer to the second outer layer 13-22 in each layer 12).

As the material for forming the outer layer 11 or the inner layer 12, for example, high-molecular compounds, such as polystyrene, polyethylene, polypropylene, polycarbonate, a nylon resin, an acrylic resin, vinyl chloride resin, and phenol resin, etc. can be used. Moreover, polyester compounds, such as polyethylene terephthalate (PET), polyethylene naphthalate (PEN), polybutylene terephthalate (PBT), and polytrimethylene terephthalate (PTT) etc. can also be used as a material. Moreover, as a material which forms the outer layer 11 or the inner layer 12, a high-molecular compound obtained by kneading a plurality of high-molecular compounds, a high-molecular compound obtained by copolymerization, or a high-molecular compound to which a suitable additive has been added can be used.

The material for the outer layer 11 or the inner layer 12 is not limited to the above-mentioned material, and any known, suitable materials may be used. However, the material may be required to be one which allows the fine periodic structure 14 to be formed on the surface 13 nearer to the outer layer of the inner layer 12 by the irradiation of light. That is, the outer layer 11 is required to show transmissibility to the wavelength of this light and the inner layer 12 which forms the fine periodic structure 14 is required to show non-transmissibility to the wavelength of this light.

Specifically, as examples of the double layer structure, a combination of "PET (outer layer 11) and PEN (inner layer 12)", a combination of "varnish material (outer layer) and PET (inner layer)", a combination of "a hard-coat material (outer layer) and polycarbonate)" or the like can be given. As the varnish material, a polyurethane-based resin, an epoxy-based resin, etc. can be used, and a polyurethane-based resin or a silicone-based resin, etc. can be used as the hard-coat material.

Moreover, as examples of the three-layer structure, "polypropylene (outer layer), an adhesive (the first inner layer) and PET (the second inner layer)", "polyethylene (outer layer), an ethylene-vinyl alcohol copolymer (the first inner layer), and PET (the second inner layer)", etc. can be mentioned. As the adhesive, a urethane-based resin, an ethylene-vinyl acetate copolymer resin or the like can be used.

The structural body 10 may be subjected to a modification step.

The modification step means a step in which light irradiation is conducted in order to modify the structural body 10 (an object 10d to be processed).

In this embodiment, modification means changing the nature of the object 10d to be processed, which cannot be subjected to laser processing, so that the object can be subjected to laser processing.

Figure 16:
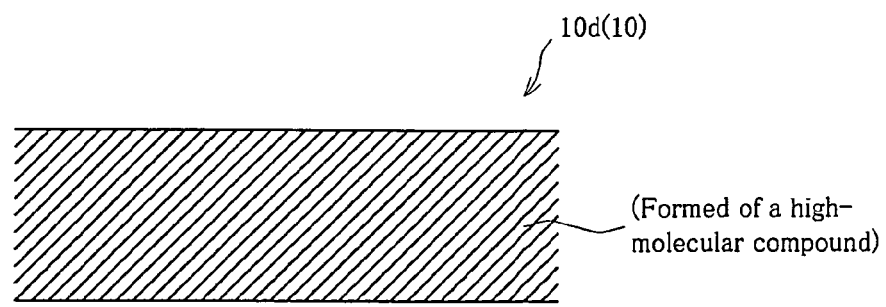
FIG. 16 is a cross-sectional diagrammatical view showing another structure of a structural body (an object to be processed) of the embodiment of the present invention.
Figure 17:
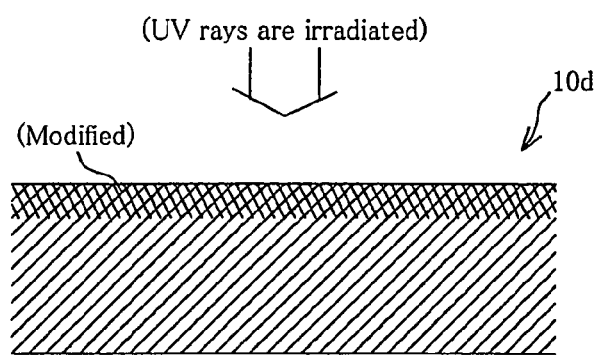
FIG. 17 is a cross-sectional diagrammatical view showing the structure of a structural body (an object to be processed) during the process of modification.
Figure 18:
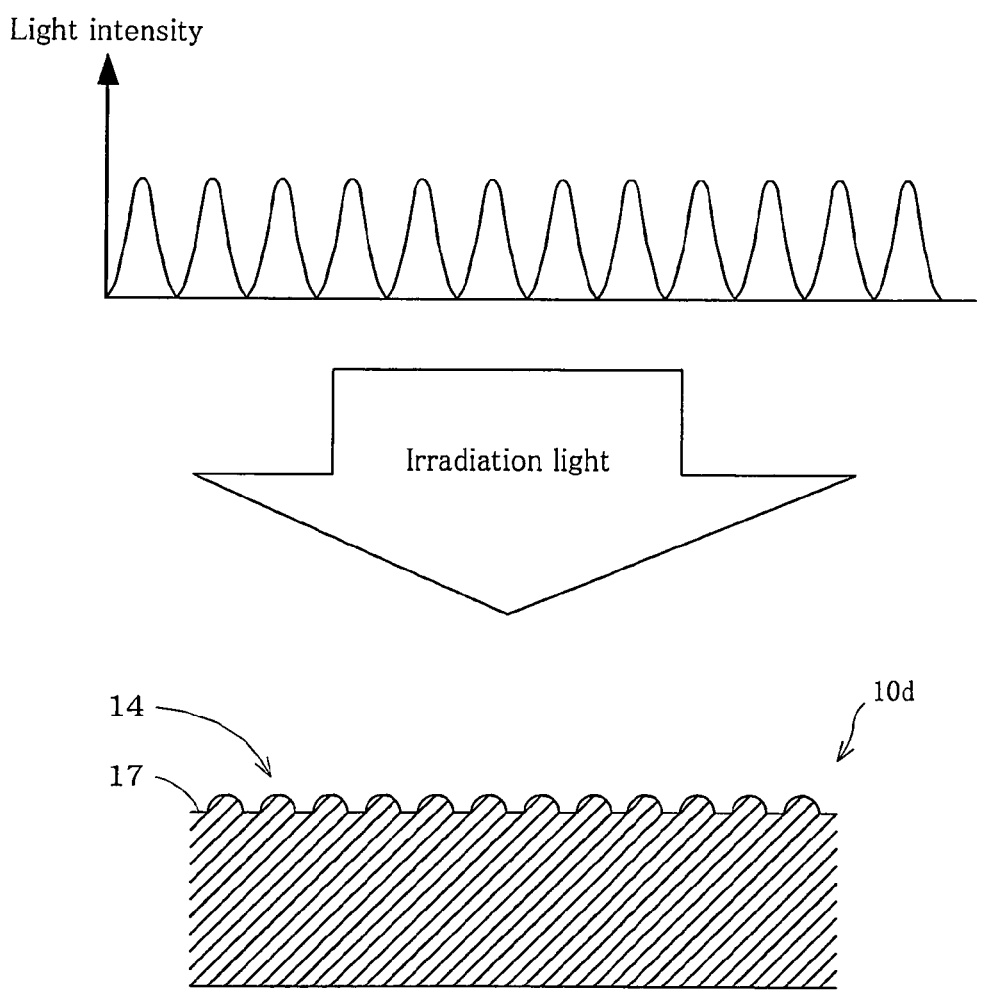
FIG. 18 is a waveform diagram and a cross-sectional diagrammatical view showing the state in which a structural body (an object to be processed) is irradiated with light with a periodic intensity distribution.

FIG. 16 is a cross-sectional diagrammatical view showing the cross-sectional shape of the structural body 10 (the object 10d to be processed) before it is subjected to the modification stage. FIG. 17 is a cross-sectional diagrammatical view showing the cross-sectional shape of the structural body 10 (the object 10d to be processed) after it is subjected to the modification stage. FIG. 18 are a waveform chart and a cross-sectional diagrammatical view showing the manner in which the structural body 10 (the object 10d to be processed) is irradiated with light having a periodic intensity distribution.

The object 10d to be processed has a high-molecular compound in at least part thereof (see FIG. 16).

This high-molecular compound has a nature of transmitting laser light.

After the modification process, this object 10d to be processed has a part in which the laser light absorptivity is enhanced (modified part) (see FIG. 17). The reason therefor is that, during the modification process, part or all of the high-molecular compound is irradiated with UV rays, and the irradiated part is then modified.

Further, after the laser processing process, the object 10d to be processed has the fine periodic structure 14 on the surface 17 thereof (see FIG. 18). The reason therefor is that, during the laser processing process, when the modified part is irradiated with laser light, the fine periodic structure 14 is formed on the surface 17 thereof.

The object 10d to be processed may be a single-layer structural body 10 or a multilayer structural body 10.

If the object 10d to be processed is the multilayer structural body 10, after the modification step, the layer having transmissibility is modified, whereby the fine periodic structure 14 can be formed. The layer to be modified is a layer which can transmit laser light.

If the object 10d to be processed is a single-layer structural body 10, it is possible to modify it, and the thus modified object 10d to be processed can be used as one layer of the multilayer structural body 10. In this case, the layer formed by the object 10d to be processed may be the inner layer 12 or the outer layer 11. As for the detail of the modification step, an explanation will be made on the "laser processing method" given later.

[Laser Light Irradiation Apparatus]

Next, a laser light irradiation apparatus for generating laser light having a periodic intensity distribution will be explained with reference to FIG. 19.

Figure 19:
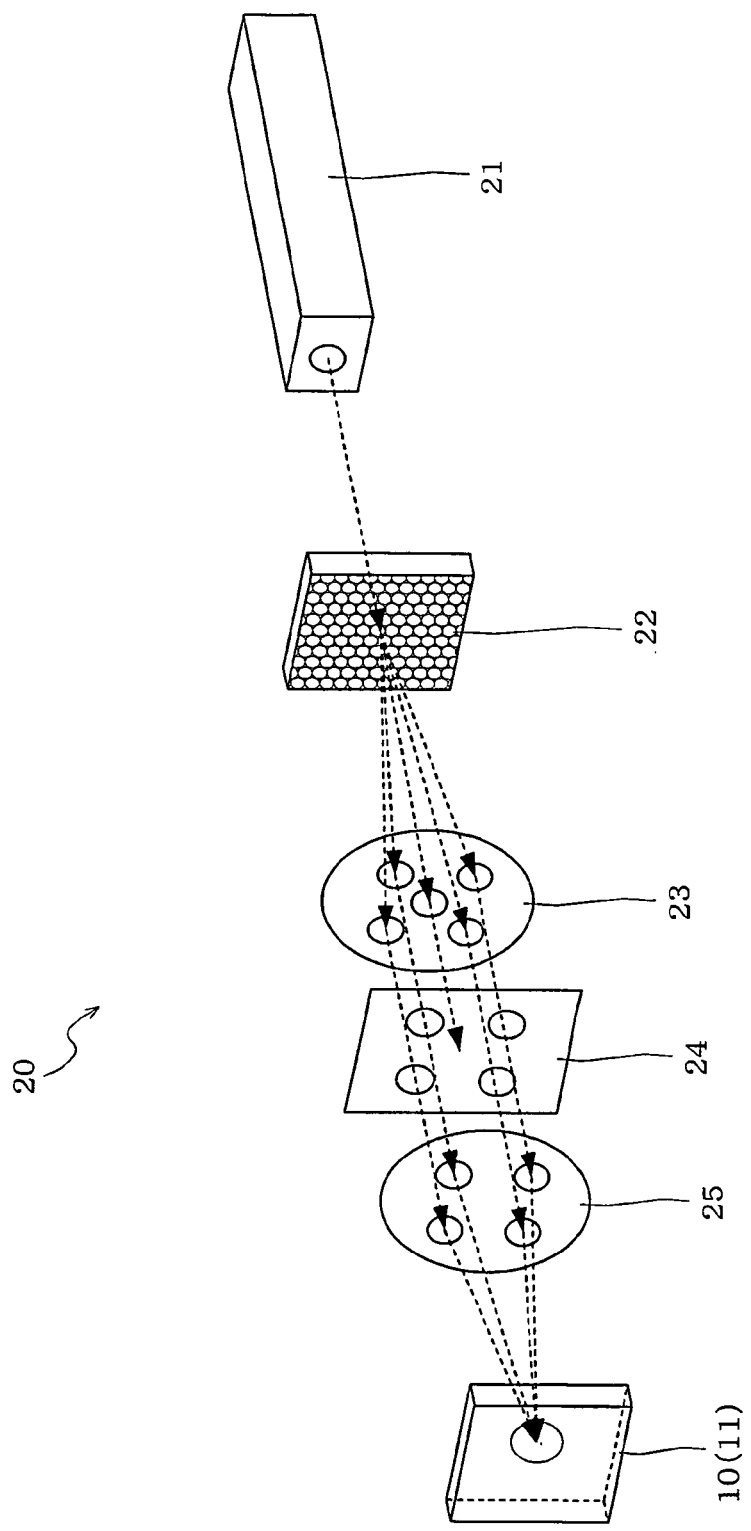
FIG. 19 is a schematic perspective view showing the constitution of a laser light irradiation apparatus.

FIG. 19 is a diagrammatical perspective view showing the configuration of the laser light irradiation apparatus.

As shown in the figure, a laser light irradiation apparatus 20 is provided with a laser oscillator 21, a beam splitter (transmission diffractive optical element) 22, a collimator element 23, a light flux selection element 24 and a light-condensing element 25.

The laser oscillator (laser light source) 21 is an apparatus which outputs laser. For example, a nano second laser or a pico second laser, such as a YAG laser, a $YVO_4$ laser, and a YLF laser can be used. Although these pulse lasers have a repetition frequency of several Hz to several tens of MHz, and outputs the energy stored during this repetition cycle in a significantly short time width of several ps to several tens ns. Therefore, high peak power can be effectively obtained from a small amount of input energy.

This laser oscillator 21 has a function of adjusting the number of irradiation pulses. Moreover, the laser oscillator 21 can also control energy density (fluence: energy per irradiation area) of one-pulse by adjusting the output of laser.

In addition to the adjustment of the laser output in the laser oscillator 21, the energy density can be controlled, for example, by changing the diameter of an irradiation beam with the same laser output.

The beam splitter 22 is a transmission optical element which causes diffraction since fine concave or convex parts are periodically formed on the surface thereof, and divides laser light into a plurality of light fluxes.

As the collimator element 23, a synthetic quartz planoconvex lens with a focal length of 200 mm can be used, for example. In this case, the collimator element 23 is placed at a position 200 mm away from the beam splitter 22. The collimator element 23 passes a plurality of light fluxes which have been divided by the beam splitter 22.

The light flux selection element 24 is placed on a position at which the light flux which has passed the collimator element 23 focuses, and, it is possible to use a mask which blocks light fluxes which are not required for interference and passes light flux which is required for interference.

As the condensing element 25, a synthetic quartz planoconvex lens with a focal length of 100 mm can be used, for example. The condensing element 25 condenses light flux which has passed the light flux selection element 24, and allows the light flux to be crossed and interfered. The thus interfered region has a high intensity distribution, as shown in FIG. 17, and the structural body 10 is irradiated with this region.

At this time the interval (cycle) d of the high intensity region in the interference region differs according to the crossing angle θ of the light flux. The cycle d of the high intensity region can be obtained by the following formula using the laser wavelength λ and the crossing angle θ of light flux.

$$d=\lambda/\{2\sin(\theta/2)\}$$

As the collimator element 23 or the condensing element 25, optical elements, such as a fresnel lens and a GRIN (Graded-Index) lens can be used in addition to a convex lens.

[Method for Forming Structural Body]

Figure 20:
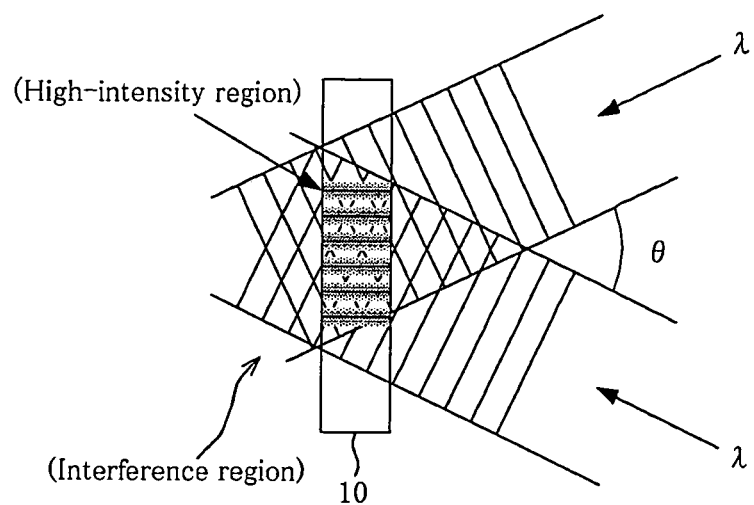
FIG. 20 is a diagrammatical view showing an interference region of light to be irradiated to a structural body.

Next, the method for forming a structural body in this embodiment will be explained with reference to FIGS. 20 to 21(*i*)(*ii*).

At first, the structural body 10 is arranged at a position which is away for a specific distance from a condensing element 25 of the laser light irradiation apparatus 20. This position is in the interference region where a plurality of light fluxes cross by the light-condensing element 25 (see FIG. 20).

Figure 21:
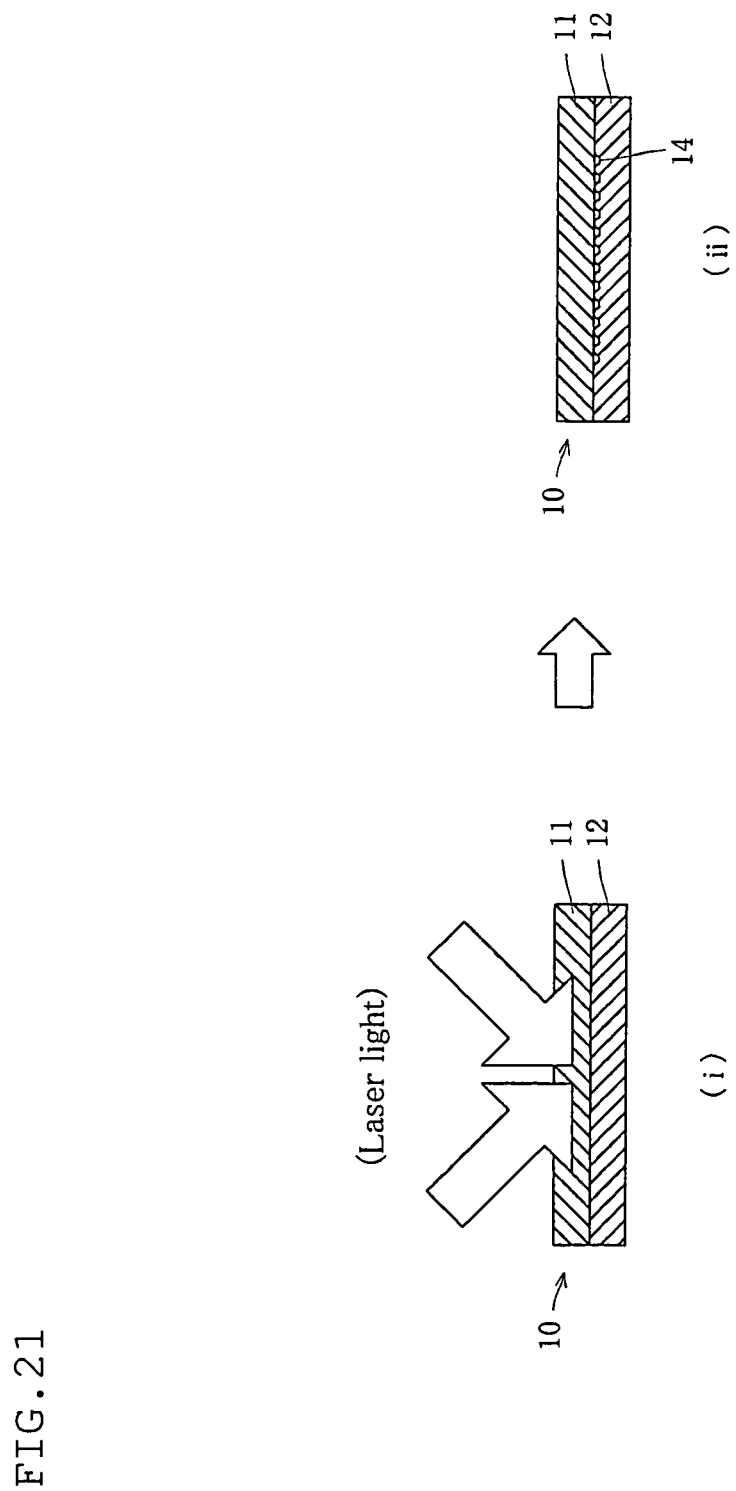
FIG. 21 is a diagrammatical view showing the procedure of forming a structural body.

The laser light irradiation apparatus 20 outputs laser light, the beam splitter 22 divides laser light to form a plurality of light flux, and the light-condensing element 25 allows these plurality of light flux to cross, thereby to form an interference region, and the structural body 10 is irradiated with the interference region (FIG. 21(*i*)).

Here, the outer layer 11 of the structural body 10 is formed of a resin which shows transmissibility to the wavelength of laser light. Therefore, the laser light transmits the outer layer 11.

The inner layer 12 of the structural body 10 is formed of a resin which shows non-transmissibility for the wavelength of laser light. Therefore, the laser light which has transmitted the outer layer 11 cannot advance forward from the surface 13 nearer to the outer layer of the inner layer 12.

Further, by conducting laser light irradiation in the interference region, a periodic light intensity distribution is excited on the surface 13 nearer to the outer layer of the inner layer 12, whereby laser abrasion occurs in the high intensity part.

Laser abrasion means a photodecomposition (evaporation) phenomenon in which, when a substance is irradiated with laser light, the substance is then dispersed from the surface in the form of a molecular cluster.

Due to the generation of laser abrasion (generation of photodecomposition), the fine periodic structure 14 in the form of convexes and concaves is formed on the surface 13 nearer to the outer layer (FIG. 21(*ii*)). This fine periodic structure 14 is formed with the same cycle as that of the periodic intensity distribution.

An explanation is made on the wavelength of laser light which is used in a two-layered structural body and the wavelength of laser light which is used in a three-layered structural body.

(Two-Layered Structural Body)

Figure 22:
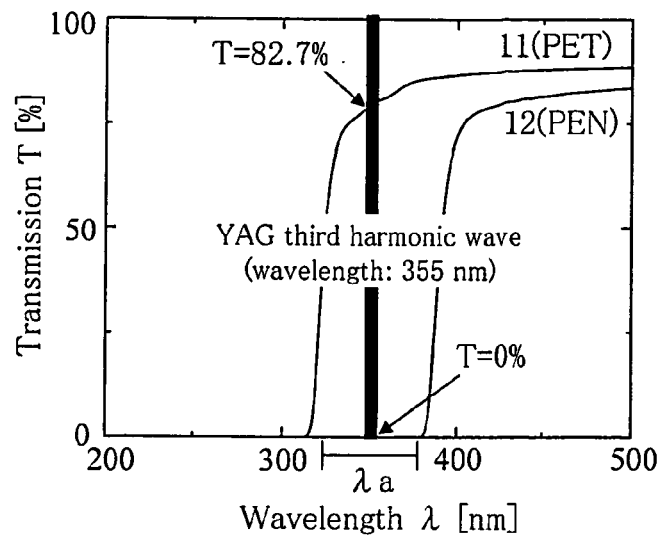
FIG. 22 is a graph showing a transmission spectrum of each of PET forming the outer layer and PEN forming the inner layer.

If the structural body 10 has a two-layered structure, as for the transmission spectrum of each layer, the spectrum differs from layer to layer as shown in FIG. 22.

For example, if the outer layer 11 is formed of PET and the inner layer 12 is formed of PEN, as shown in FIG. 22, the wavelength of light for which the outer layer 11 shows semi-transmissibility is around 320 nm, and the wavelength of light for which the inner layer 12 shows semi-transmissibility is around 380 nm.

When the fine periodic structure 14 is formed on the surface 13 nearer to the outer layer of the inner layer 12, the wavelength of the irradiated light becomes a wavelength which is included in a wavelength region λa in which the outer layer 11 shows transmissibility and the inner layer 12 shows non-transmissibility.

Specifically, in the case shown in the figure, light with a wavelength of 330 nm to 370 nm (for example, the YAG third harmonic wave: wavelength λ=355 nm) can be used.

In the case where the YAG third harmonic wave of 355 nm is used, the outer layer 11 (PET) shows a transmissibility T of 82.7% and the inner layer 12 (PEN) shows a transmissibility T of 0%.

In this way, light irradiated from the side of the outer layer 11 transmits the outer layer 11 to reach the inner layer 12. The light cannot further advance from the vicinity of the surface of the inner layer 12, and hence, photodecomposition occurs in the surface 13 nearer to the outer layer of the inner layer 12, whereby the fine periodic structure 14 is formed.

(Three-Layered Structural Body (The Inner Layer is Two-Layered))

Figure 23:
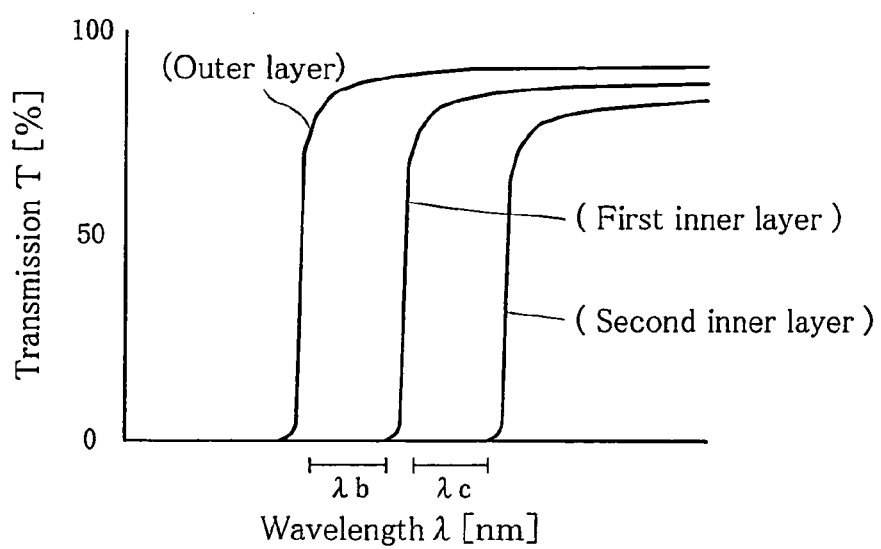
FIG. 23 is a graph showing a transmission spectrum of each of the outer layer, the first inner layer and the second inner layer.

When the structural body 10 has a three-layered structure and the inner layer 12 has a two-layered structure (the case shown in FIG. 8), the transmission spectrum of each layer differs from layer to layer, as shown in FIG. 23.

When a fine periodic structure 14-11 is formed on the surface 13-11 nearer to the outer layer of the first inner layer 12-1 (the case shown in FIG. 9), as the wavelength of irradiation light, one which is included in a wavelength region λb in which the outer layer 11 shows transmissibility and the first inner layer 12-1 shows non-transmissibility is selected.

In this way, light irradiated from the side of the outer layer 11 transmits the outer layer 11 to reach the first inner layer 12-1. Since the light cannot further advance from the vicinity of the surface of the first inner layer 12-1, the fine periodic structure 14-11 is formed on the surface 13-11 nearer to the outer layer of the first inner layer 12-1.

When a fine periodic structure 14-12 is formed on the surface 13-12 nearer to the outer layer of the second inner layer 12-2 (the case shown in FIG. 10), as the wavelength of irradiation light, one which is included in a wavelength region λc in which the outer layer 11 and the first inner layer 12-1 shows transmissibility and the second inner layer 12-2 shows non-transmissibility is selected.

In this way, light irradiated from the side of the outer layer 11 transmits the outer layer 11 and the first inner layer 12-1 to reach the second inner layer 12-2. Since the light cannot further advance further from the vicinity of the surface of the second inner layer 12-2, a fine periodic structure 14-12 is formed on the surface 13-12 nearer to the outer layer of the second inner layer 12-2.

Furthermore, when the fine periodic structures 14-11 and 14-12 are formed in the surface 13-11 nearer to the outer layer of the first inner layer 12-1, and the surface 13-12 nearer to the outer layer of the second inner layer 12-2, respectively (the case shown in FIG. 11), first, light with a wavelength included in the wavelength region λc in which the outer layer 11 and the first inner layer 12-1 shows transmissibility and the second inner layer 12-2 shows non-transmissibility is irradiated, followed by irradiation of light with a wavelength included in the wavelength region λb in which the outer layer 11 shows transmissibility and the first inner layer 12-1 shows non-transmissibility.

As a result, the fine periodic structure 14-12 and the fine periodic structure 14-11 are respectively formed.

(Three-Layered Structural Body (The Outer Layer is Two-Layered))

When the structural body 10 has a three-layered structure and the outer layer 11 has a two-layered structure (the case shown in FIG. 12), the transmission spectrum of each layer differs between the outer layer 11 and the inner layer 12. In particular, when the two outer layers 11 are formed of the same resin, as shown in FIG. 22, two spectra, i.e., the spectrum of the outer layer 11 and the spectrum of the inner layer 12, appear.

When a fine periodic structure 14-21 is formed on the surface 13-21 nearer to the first outer layer of the inner layer 12 (the case shown in FIG. 13), as the wavelength of irradiation light, one which is included in a wavelength region (λa in FIG. 22) in which the first outer layer 11-1 shows transmissibility and the inner layer 12 shows non-transmissibility is selected. The light with this wavelength is emitted from the first outer layer 11-1 to the inner layer 12.

As a result, the light transmits the first outer layer 11-1 to reach the inner layer 12, but cannot advance further from the vicinity of the surface of this inner layer 12, whereby a fine periodic structure 14-21 is formed on the surface 13-21 nearer to the first outer layer of the inner layer 12.

Furthermore, when a fine periodic structure 14-22 is formed in the surface 13-22 nearer to the outer layer of the inner layer 12 (the case shown in FIG. 14), as the wavelength of irradiation light, one which is included in a wavelength region (λa in FIG. 22) in which the second outer layer 11-2 shows transmissibility and the second inner layer 12 shows non-transmissibility is selected. The light with this wavelength is emitted from the second outer layer 11-2 to the inner layer 12.

As a result, the light transmits the second outer layer 11-2 to reach the inner layer 12, but cannot advance further from the vicinity of the surface of the inner layer 12, whereby a fine periodic structure 14-22 is formed on the surface 13-22 nearer to the second outer layer of the inner layer 12.

Furthermore, when the fine periodic structures 14-21 and 14-22 are formed in the surface 13-21 nearer to the first outer layer of the inner layer 12 and the surface 13-22 nearer to the second outer layer of the inner layer 12, respectively (the case shown in FIG. 15), first, light with a wavelength included in the wavelength region in which the first outer layer 11-1 shows transmissibility and the inner layer 12 shows non-transmissibility is irradiated from the side of the first outer layer 11-1, followed by irradiation of light with a wavelength included in the wavelength region in which the second outer layer 11-2 shows transmissibility and the inner layer 12 shows non-transmissibility from the outside of the second outer layer 11-2.

As a result, the fine periodic structure 14-21 and the fine periodic structure 14-22 are respectively formed.

[Laser Processing Method]

Next, the embodiment of the laser processing method of the present invention will be explained with reference to FIG. 24.

Figure 24:
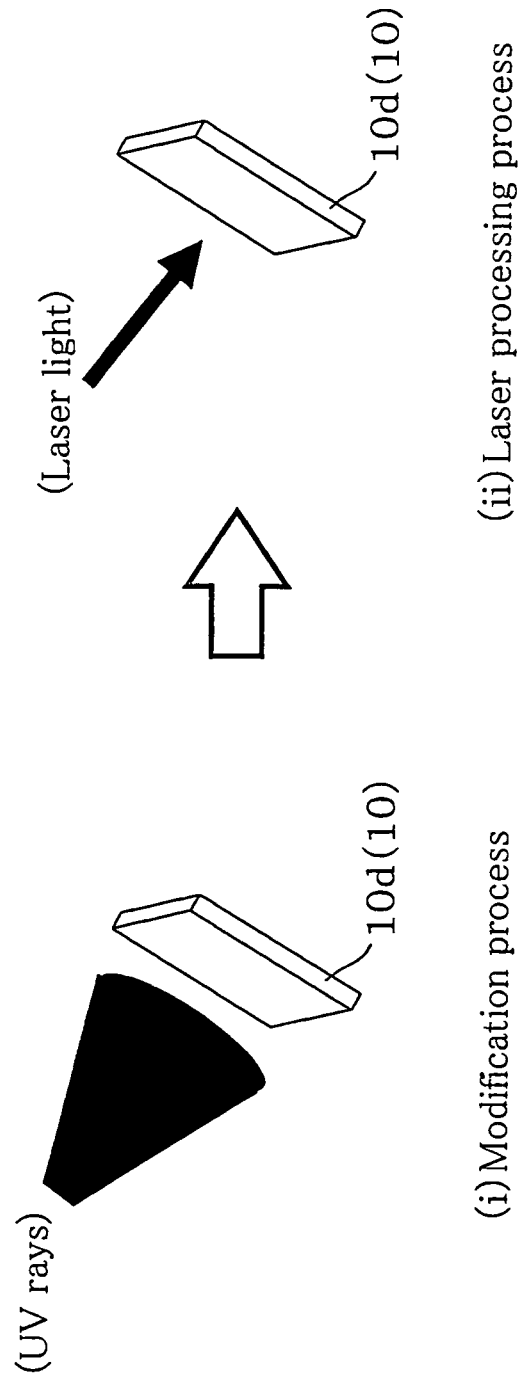
FIG. 24 is a diagrammatical view showing a process of laser processing in the embodiment of the present invention, in which (i) shows a modification step, and (ii) shows a laser processing step.

FIG. 24 is a view showing a process of laser processing according to this embodiment (a procedure of laser processing for an object to be processed (structural body)).

As shown in this figure, the laser processing method of this embodiment includes a modification process (FIG. 24(*i*)) and a laser processing process (FIG. 24(*ii*)).

Here, the modification process means the process of irradiating light for the purpose of modifying the object 10*d* to be processed.

The object 10*d* to be processed contains a high-molecular compound in at least part thereof. That is, both cases where part of the object 10*d* to be processed is formed of a high-molecular compound and all of the object 10*d* to be processed is formed of a high-molecular compound are included.

As examples of the former, the following may be included. For example, a case may be included in which the object 10*d* to be processed is of a multilayer structure of two or more, with at least one of them being formed of a high-molecular compound. In addition, a case may be included in which the object 10*d* to be treated is formed in the shape of a sheet, with part thereof is formed of a high-molecular compound.

A high-molecular compound shows any of "transmissibility", "semi-transmissibility" and "non-transmissibility" to laser light.

The "transmissibility", "semi-transmissibility" and "non-transmissibility" are as defined as follows.

For a certain substance, capability of transmitting 70% or more of light with the wavelength of laser light is defined as the "transmissibility", capability of transmitting 10% or more and less than 70% of light with the wavelength of laser light is defined as the "semi-transmissibility" and capability of transmitting less than 10% of light with the wavelength of laser light is defined as the "non-transmissibility".

The specific example is shown in FIG. 3. FIG. 3 is a graph showing a transmission spectrum of an elongated PET sheet, which is a high-molecular compound.

As shown in FIG. 3, if the object 10*d* to be processed is an elongated PET sheet, it shows "transmissibility" for laser light with a wavelength of about 330 nm or more, shows "semi-transmissibility" for laser light with a wavelength of around 325 nm, and shows "non-transmissibility" for laser light with a wavelength of 320 nm or less.

As mentioned above, the part formed of a high-molecular compound of the object 10d to be processed shows any of the above-mentioned properties for the wavelength of laser light.

If a high-molecular compound shows transmissibility for light with a certain wavelength, the laser light with this wavelength penetrates inside the high-molecular compound. That is, a high-molecular compound absorbs a small amount of laser light, and hence, interaction between light and a substance (for example, light-heat conversion) is hard to occur.

On the other hand, if a high-molecular compound shows non-transmissibility, laser light advances only to the vicinity of the surface of the high-molecular compound.

In the modification step, UV rays are included in the light to be emitted to the object 10d to be processed.

UV light (UV rays) is invisible electromagnetic waves with a wavelength of 10 to 400 nm, which is shorter than that of visible light and longer than that of soft X-rays.

The high-molecular compound is modified by irradiation of this UV rays.

For example, when a sheet of polyethylene terephthalate (PET), a kind of a high-molecular compound (plastics), is irradiated with UV rays, decomposition and oxidation of a high-molecular chain occur from the surface irradiated. An oxidization functional group is generated in an oligomer and a PET main chain, and this oxidization functional group absorbs the light with a specific wavelength. The thus modified high-molecular compound has a higher absorptivity of laser light of which the wavelength is included in the above-mentioned wavelength region, whereby an interaction between light and a substance easily occurs.

The inventor analyzed the surface of the object 10d to be processed (specifically, a PET sheet which is a high-molecular compound) after the UV processing. As a result, the inventor confirmed the formation of an oligomer or the generation of an oxidation functional group in the PET main chain.

Claims 13 and 22 state that "the light irradiated for modification includes UV rays with a wavelength of 400 nm or less". Here, the UV rays as referred to herein mean UV rays with a wavelength which contributes to decomposition or oxidation of a high-molecular compound (the object to be processed).

The laser processing process means a process in which a predetermined processing is conducted on a high-molecular compound of which part or all which has been modified in the modification step by irradiating part or all of the modified part thereof with laser light.

Since the high-molecular compound has improved absorptivity for laser light due to the irradiation of UV rays, a predetermined laser processing can be conducted easily. Here, the predetermined laser processing includes laser marking or the like, for example.

Figure 28:
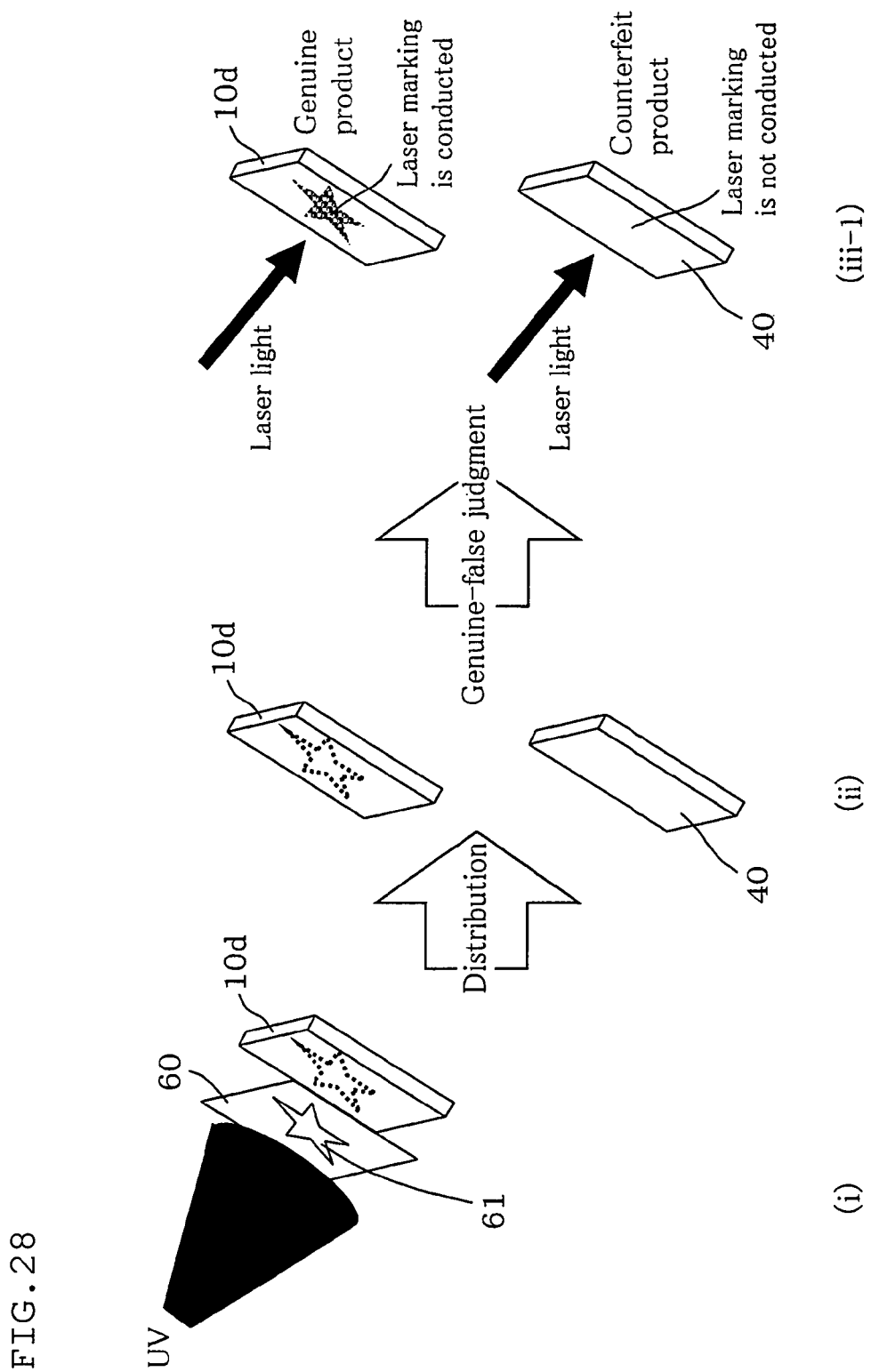
FIG. 28 is a diagrammatical view showing the procedure of the first example of the method for discriminating between true and false objects, in which (i) shows the stage of modification, (ii) shows the stage of distribution and (iii-1) shows the stage of discriminating between true and false objects.

In this embodiment, laser marking indicates a region in which parts developing a structural color are uniformly formed or a character, a figure, a symbol, etc. drawn by appropriately arranging parts developing a structural color. As examples of this laser marking, as shown in FIG. 28(iii-1), for example, a star-shaped figure formed on a surface 17 of the object 10d to be processed can be given.

[Laser Marking Method]

Next, the laser marking method in the laser processing process will be explained with reference to FIG. 18.

In the laser processing process, the object 10d to be processed is irradiated with light with a wavelength which is included in a wavelength region in which this object 10d to be processed shows transmissibility. Specifically, the object is irradiated with light with a wavelength of 330 nm or more (for example, the third harmonic wave of a YAG laser (THG-YAG): wavelength, 355 nm (see FIG. 3).

Here, when the object 10d to be processed has not been modified, it has poor absorptivity for laser light. Therefore, even when the object is irradiated with laser light with a wavelength of 330 nm or more, laser marking cannot be conducted.

On the other hand, if the object 10d to be processed has been modified, since it has higher absorptivity for laser light, if it is irradiated with laser light with a wavelength of 330 nm or more, laser marking can be conducted.

Further, as shown in FIG. 18, by irradiating the object 10d to be processed with light having a periodic intensity distribution (irradiation light), the fine periodic structure 14 can be formed on the surface 17 of the object 10d to be processed. This fine periodic structure 14 is formed in the same cycle as that of the periodic intensity distribution.

In particular, as shown in FIG. 18, if the object 10d to be processed is irradiated with laser light with a wavelength showing transmissibility in the interference region, a periodic light intensity distribution is excited on the surface 17 of the object 10d to be processed, laser abrasion occurs in the high-intensity part.

The laser abrasion means a phenomenon that, when a substance is irradiated with laser light, the substance is dispersed from the surface thereof in the form of a molecular cluster.

Due to the generation of the laser abrasion, the periodic structure 14 is formed on the surface 17 of the object 10d to be processed.

Examples of Method for Forming Structural Body

Next, an example of the method for forming a structural body of this embodiment will be explained.

As the structural body 10, a three-layered extrusion sheet was used in which the inner layer 12 is formed of polyethylene terephthalate (PEN) and the first outer layer 11-1 and the second outer layer 11-2 are each formed of polyethylene naphthalate (PET).

The thickness of each layer was about 100 μm.

As the laser light, the third harmonic wave of a Q-switched pulse YAG laser (wavelength: 355 nm) which shows non-transmissibility for PEN and shows transmissibility for PET was used.

In an elongated sheet with a thickness of 150 μm, the transmissibility of the third harmonic wave of a pulse YAG laser is 0% for PEN and 82.7% for PET. As for the specification of the pulse YAG laser, the pulse width was 5 ns and the repetition frequency was 10 Hz.

The above-mentioned structural body 10 was irradiated with the third harmonic wave of a YAG laser by means of a laser irradiation apparatus 20.

When one shot of pulse was irradiated at an irradiation energy density of 43 [mJ/cm$^2$], the fine periodic structure 14 was formed at a part nearer to the inner layer 12 in the interface between the outer layer 11 from which the laser light was irradiated and the inner layer 12. A structural color of rainbow color was observed. The cycle of the fine periodic structure formed at this time was about 1.6 μm.

As the structural body having a multilayer structure, a multilayer film with a three-layer structure in which the outer layer is formed of polypropylene (PP), the first inner layer is formed of an adhesive and the second inner layer is formed of polyethylene terephthalate (PET) was used. As the adhesive, a urethane-based adhesive was used. As for the thickness of each layer, the PP layer was about 24 μm, the adhesive layer was about 2 μm and the PET layer was about 16 μm.

As the laser light, the fourth harmonic wave of a Q-switched pulse YAG laser (wavelength: 266 nm) which shows transmissibility for PP and shows non-transmissibility for the adhesive layer and PET was used. The transmissibility of the fourth harmonic wave of a YAG laser is 78.1% for PP (thickness: 12 μm) and 0% for the adhesive (thickness: 2 μm) and PET (thickness: 12 μm). As for the specification of the pulse YAG laser, the pulse width is 5 ns and the repetition frequency is 10 Hz.

The above-mentioned structural body was irradiated, from the outer layer side, with the fourth harmonic wave of a YAG laser by means of a laser irradiation apparatus. When one-shot of pulse was irradiated at an irradiation energy density of 50 [mJ/cm$^2$], the fine periodic structure was formed in the interface between the outer layer and the first inner layer at a part nearer to the first inner layer. A structural color of rainbow color was observed. The cycle of the fine periodic structure formed at this time was about 1.55 μm.

First Example of Laser Processing Method

Next, the first example of the laser processing method will be explained.

Example 1

As the object 10d to be processed, a plurality of elongated PET sheets each having a thickness of 150 μm were prepared.

Of these elongated PET sheets, one or several sheets were irradiated for 10 minutes with UV rays emitted from a mercury and xenon lamp (manufactured by USHIO, Inc.) which was placed 12 cm away from the sheet.

The transmissibility of the elongated PET sheet for light with a wavelength of 355 nm was measured, and the results revealed that the transmissibility was 82.3% before the irradiation and 76.7% after the irradiation.

Subsequently, the above-mentioned elongated PET sheet which had been irradiated with UV rays and an elongated PET sheet which had not been irradiated with UV rays were prepared. These sheets were irradiated with the third harmonic wave of a Q-switch pulse YAG laser (wavelength: 355 nm), which shows transmissibility for an elongated PET sheet, by means of a laser light irradiation apparatus.

As for the specification of the pulse YAG laser, the pulse width was 5 ns and the repetition frequency was 10 Hz. One pulse shot was irradiated at an irradiation energy density of 400 [mJ/cm$^2$] and 15 pulse shots were irradiated at an irradiation energy density of 100 [mJ/cm$^2$].

The results are shown in FIGS. 25(i) to (iii). As shown in FIG. 25(i), no change was observed in the non-irradiated PET sheet. On the other hand, as shown in FIGS. 25(ii) and (iii), in the PET sheets which had been irradiated with UV rays, laser marking was conducted on the UV-irradiated surface, and a structural color was observed.

In the image shown in FIG. 25(ii), the laser marking shown in the upper half was a laser making formed by irradiating one shot of laser light with a fluence of 400 [mJ/cm$^2$] and the laser marking shown in the lower half was a laser making formed by irradiating 15 shots of laser light with a fluence of 100 [mJ/cm$^2$].

FIG. 25(iii) is an enlarged SEM image of a part of the elongated PET sheet shown in FIG. 25(ii) in which the laser marking was conducted.

As mentioned above, as a result of Example 1, it revealed that laser processing could be conducted on a high-molecular compound by irradiating it with UV rays in advance.

Example 2

As the object 10d to be processed, a plurality of elongated PET sheets each having a thickness of 150 μm was prepared.

Of these elongated PET sheets, one or several sheets were irradiated for 5 seconds with UV rays emitted from a mercury and xenon lamp (manufactured by USHIO, Inc.) which was placed 55 mm away from the sheet.

The transmissibility of the elongated PET sheet for light with a wavelength of 355 nm was measured, and the results revealed that the transmissibility was 82.3% before the irradiation and 82.1% after the irradiation.

Subsequently, the above-mentioned elongated PET sheet which had been irradiated with UV rays and an elongated PET sheet which had not been irradiated with UV rays were prepared. These sheets were irradiated with the third harmonic wave of a Q-switch pulse YAG laser (wavelength: 355 nm), which shows transmissibility for an elongated PET sheet, by means of an interference optical system (laser light irradiation apparatus 20).

As for the specification of the pulse YAG laser, the pulse width was 5 ns and the repetition frequency was 10 Hz. One pulse shot was irradiated at an irradiation energy density of 400 [mJ/cm$^2$].

As a result, no change was observed in the non-irradiated PET sheet. On the other hand, in the PET sheets which had been irradiated with UV rays, laser marking was conducted on the UV-irradiated surface, and a structural color was observed.

As mentioned above, as a result of Example 2, it revealed that laser processing could be conducted on a high-molecular compound even when UV rays were irradiated for 5 seconds from a position which was 55 mm away from the high-molecular compound.

Example 3

As the object 10d to be processed, four elongated PET sheets each having a thickness of 150 μm were prepared.

Of these elongated PET sheets, one elongated PET sheet was irradiated with UV rays emitted from a UV lamp (black light) with an emission peak wavelength of 254 nm for 90 minutes. Another elongated PET sheet was irradiated with UV rays emitted from a UV lamp with a wavelength of 302 nm for the same period of time. Still another elongated PET sheet was irradiated with UV rays emitted from a UV lamp with a wavelength of 365 nm for the same period of time. The remaining elongated PET sheet was not irradiated with UV rays emitted from a UV lamp.

Here, as for the transmissibility of the elongated PET sheet at a wavelength of 355 nm, the non-irradiated sheet showed 82.3%, the sheet irradiated with light with a wavelength of 254 nm was 80.4%, the sheet irradiated with light with a wavelength of 302 nm was 77.9% and the sheet irradiated with light with a wavelength of 365 nm was 81.8%.

Subsequently, the above-mentioned four elongated PET sheets were irradiated with the third harmonic wave of a YAG laser (wavelength: 355 nm) by means of a laser irradiation apparatus.

Each PET sheet which had been irradiated with UV rays at each peak wavelength was irradiated with one pulse shot at an irradiation energy density of 400 [mJ/cm$^2$]. As a result, it was found that, while no change was observed in the PET sheet which had been irradiated with light with a wavelength of 365 nm, laser marking could be conducted on the UV-irradiated surface in a PET sheet which had been irradiated with light with a wavelength of 254 nm and a PET sheet which had been irradiated with light with a wavelength of 302 nm.

First Embodiment of Method for Discriminating between True and False Objects

Next, the first embodiment of the method for discriminating between true and false objects utilizing the laser making of this embodiment will be explained with reference to FIG. 26.

Figure 26:
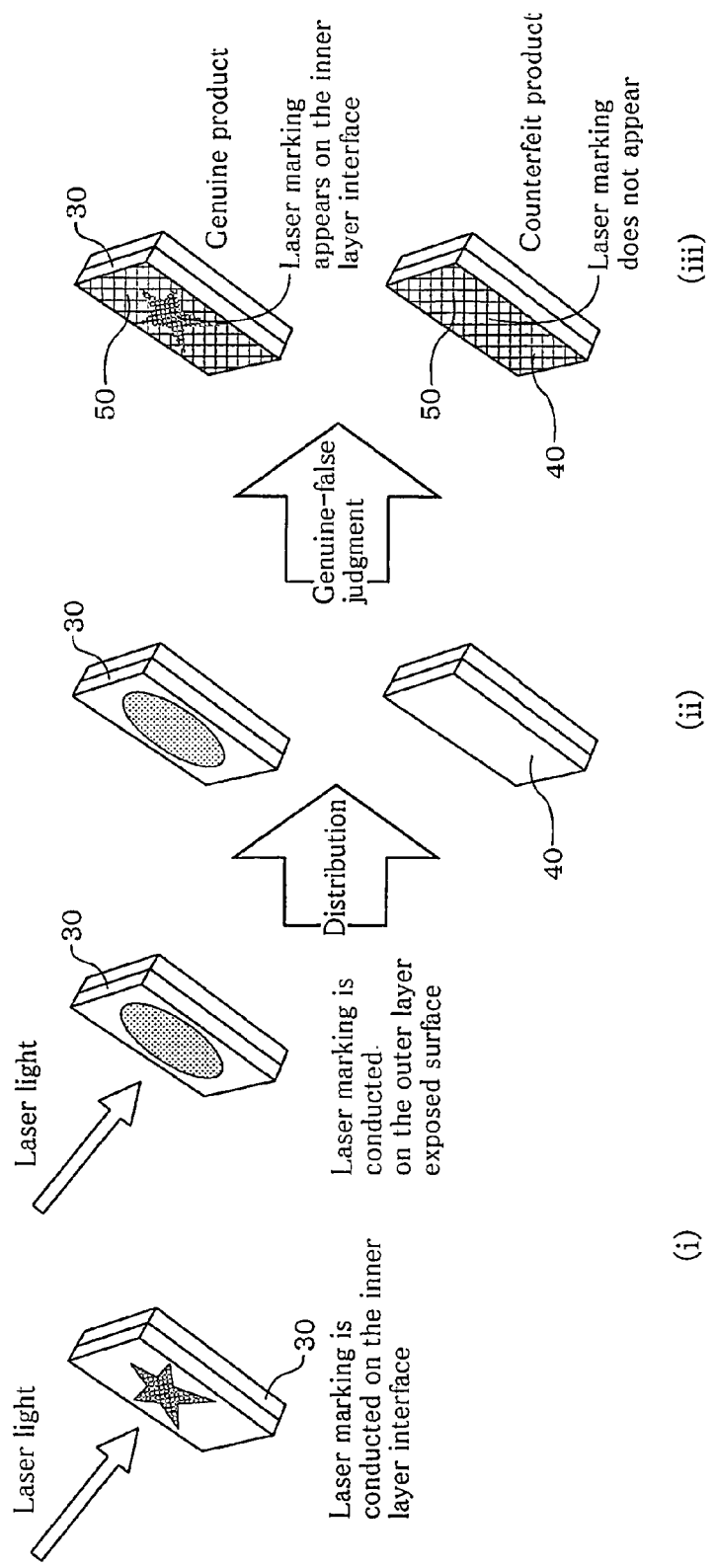
FIG. 26 is a diagrammatical view showing the procedure of a method for discriminating truth and false objects, in which (i) shows a preparation stage (laser marking forming stage), (ii) shows a distribution stage and (ii) shows a true-false judging stage.

FIG. 26 is a view showing the procedure of the method for discriminating between true and false objects step by step.

According to the method for discriminating between true and false objects of this embodiment, laser marking is conducted on an interface of the inner layer and an exposed surface of the outer layer of an object to be processed which has to be judged to be true, in the stage after distribution, a functional material is applied on the exposed surface of the object to be processed or a forged distributed product, and if laser marking in a specific shape appears, the object to be processed or the distributed product to which this object to be processed is attached is judged as a true product.

As shown in the figure, the method for discriminating between true and false objects of this embodiment includes a preparation stage (laser marking forming stage (FIG. 26(*i*)), a distribution stage (FIG. 26(*ii*)) and a true-false judgment stage (FIG. 26(*iii*)).

Here, the preparation stage is a stage in which an object 30 to be processed (structural body 10) is irradiated with laser light to form laser marking (fine periodic structure 14) in the interface of the inner layer and the exposed surface of the outer layer of the object to be processed.

Figure 27:
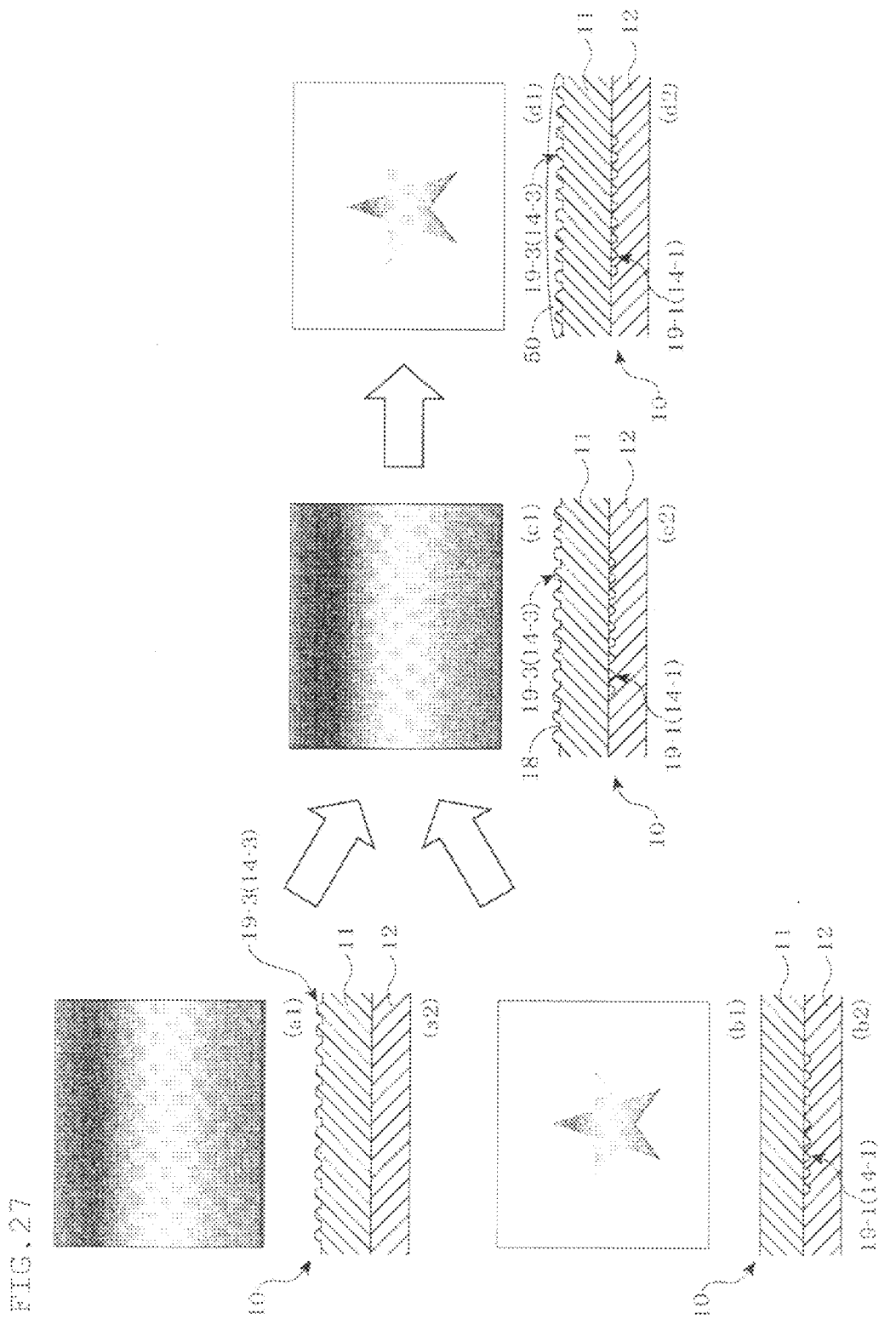
FIG. 27 is a view for explaining the method for discriminating true and false objects using the structural body of this embodiment, in which (a1) and (a2) are views each showing a structural color developed when a fine periodic structure is formed on the outer layer; (b1) and (b2) are views each showing a structural color developed when a fine periodic structure is formed on the inner layer; (c1) and (c2) are views each showing a structural color developed when a fine periodic structure is formed on each of the outer layer and the inner layer; and (d1) and (d2) are views each showing a structural color developed when a functional material is in contact with the fine periodic structure on the outer layer.

Specifically, as shown in FIG. 27(*c*2), a fine periodic structure 14-1 (laser marking 19-1) is formed on the surface 13 nearer to the outer layer of the inner layer 12 of the structural body 10, and a fine periodic structure 14-3 (laser marking 19-3) is formed on the exposed surface 18 of the outer layer 11.

If the fine periodic structure 14-1 is formed on the surface 13 nearer to the outer layer of the inner layer 12, light with a wavelength for which the outer layer 11 shows transmissibility and for which the inner layer 12 shows non-transmissibility is irradiated.

On the other hand, when a fine periodic structure 14-3 is formed on the exposed surface 18 of the outer layer 11, light with a wavelength for which the outer layer 11 shows non-transmissibility is irradiated. As in the case of the fine periodic structure 14-1 formed in the inner layer 12, the fine periodic structure 14-3 formed on the exposed surface 18 of the outer layer 11 has a regular arrangement which develops a structural color.

The fine periodic structure 14-1 formed in the inner layer 12 and the fine periodic structure 14-3 formed in the outer layer 11 may differ in the range of formation or shape of the structure.

However, part or all of the fine periodic structure 14-1 and the fine periodic structure 14-3 are caused to be overlapped as viewed from the side of the outer layer 11. In particular, overlapping is conducted to such a degree that the shape of the fine periodic structure 14-1 cannot be judged since it is covered by the fine periodic structure 14-3. The purpose therefor is to keep the shape of the fine periodic structure 14-1 formed in the inner layer 12 secret at the distribution stage, and to clarify it for the first time in the true-false judging stage.

These fine periodic structures 14-1 and 14-3 will be explained further with reference to FIG. 27.

For example, as shown in FIGS. 27(*b*1) and (*b*2), the fine periodic structure 14-1 is formed on the surface 13 nearer to the outer layer of the inner layer 12 in a predetermined form (for example, star shape). On the other hand, as shown in FIGS. 27(*a*1) and (*a*2), the fine periodic structure 14-3 is formed entirely on the exposed surface 18 of the outer layer 11.

As a result, as shown in FIGS. 27(*c*1) and (*c*2), a structural color developed by the fine periodic structure 14-3 in the outer layer 11 can be visible, and a structural color developed by the fine periodic structure 14-1 in the inner layer 12 is concealed. The reason therefor is explained as follows. Although both a structural color developed by the fine periodic structure 14-3 in the outer layer 11 and a structural color developed by the fine periodic structure 14-1 in the inner layer 12 appear, since a structural color developed by the fine periodic structure 14-3 is strong and a structural color developed by the fine periodic structure 14-1 is weak, and hence, when both colors are developed, only a relatively-stronger color development can be recognized with human eyes. The same applies to the diffraction light if a light receiver is set like human eyes so that weak light is not detected and strong light is detected.

As a result, the shape of the fine periodic structure 14-1 can be kept secret by the true-false judgment stage.

The distribution stage is a stage where an object 30 to be processed in which the laser markings 19-1 and 19-2 are made is distributed as a product itself or in the form that it is attached to a product.

In this distribution stage, the laser marking 19-1 of the object 30 to be processed is concealed by the laser marking 19-2, and cannot be recognized by naked eyes. Therefore, it is assumed that a forged distributed product 40 in which a marking similar to the laser marking 19-2 is made or a forged distributed product 40 in which no laser marking is made (a counterfeit product of the object 30 to be processed) is put on the market. In this case, these forged distributed products 40 and the object 30 to be processed cannot be distinguished with naked eyes.

The stage for discriminating between true and false objects is a stage where, when a functional material 50 is applied to the exposed surface of the outer layer 11 of the object 30 to be processed or the forged distributed product 40, judgment is made whether the object is true or not by observing whether the laser marking 19-1 made on the inner layer 12 appears or not or whether the laser marking 19-1 which appears has a predetermined shape.

The functional material 50 covers even the detailed part of the laser marking 19-2 when it contacts or sticks to the exposed surface 18 of the outer layer 11, and its surface opposite to the surface which contacts the exposed surface 18 is smooth. It suffices that the smooth surface may be microscopically smooth, and may be flat or curved macroscopically.

Examples of the functional material 50 include, but not limited thereto, liquids such as oil, the examples of which include water and glycerin, and organic solvents, the examples of which include benzene, acetone, isopropyl alcohol, xylene, toluene, ethyl alcohol and methyl alcohol, and solids such as an adhesive body or a sticking body of a seal object.

In this true-false judging stage, when the functional material 50 is applied, if the laser marking 19-1 appears or the laser marking 19-1 which has appeared has a predetermined shape, the object to be judged can be judged as the object 30 to be processed. Also, the object 30 to be processed itself or a product to which the object 30 to be processed is attached (the object to be judged) is judged to be true.

On the other hand, if the laser marking 19-1 does not appear even if the functional material 50 is applied, or the laser making 19-1 which has appeared does not have a predetermined shape, this object to be judged can be judged to be the forged distributed product 40. The forged distributed product 40 or a product to which the forged distributed product 40 is attached is judged to be a counterfeit product.

In this way, if a counterfeit product is mixed in during the process in which the object 30 to be processed for which laser marking has been made in advance is put on the market, true-false judgment can be conducted easily by confirming whether the laser marking is made in the inner layer or the laser marking is made in a predetermined shape.

Second Embodiment of True-False Judging Method

The second embodiment of the true-false judging method utilizing the laser marking of this embodiment will be explained with reference to FIG. 28 and FIG. 29.

FIG. 28 is a view showing the procedure of the first example of the second embodiment of the method for discriminating between true and false objects. FIG. 29 is a view showing the procedure of the second example of the second embodiment of the method for discriminating between true and false objects.

First Example

In the first example, an object to be processed or a forged distributed product is irradiated with laser light, and judgment is made whether the object to be processed, etc. is true or false.

As shown in FIG. 28, the method for discriminating between true and false objects of this example includes a modification stage (preparation stage, FIG. 28(*i*)), a distribution stage (FIG. 28(*ii*)) and a true-false judging stage (FIG. 28(*iii*-1)).

Here, the modification stage is a stage in which part or all of a high-molecular compound of the object 10*d* to be processed is irradiated with UV rays.

All or part of a high-molecular compound may be irradiated with UV rays.

If part of the object 10*d* to be processed is irradiated with UV rays, as shown in FIG. 28(*i*), a shield plate 60 can be used.

The shield plate 60 is a member provided between an UV light irradiation apparatus (not shown) and the object 10*d* to be processed, and an opening 61 is formed therein.

The opening 61 is an opened part for passing part of UV rays therethrough. Due to the presence of the opening 61 in the shield plate 60, of the UV rays which has been output by the UV light irradiation apparatus, although part of the UV rays is shielded by the main body of the shield plate 60 and cannot reach the object 10*d* to be processed, the remaining UV rays pass the opening 61 to reach the object 10*d* to be processed.

On the surface 17 of the object 10*d* to be processed, UV rays are irradiated in the same shape as that of the opening 61, and the irradiated range is recorded as a range for which laser making can be made.

The opening 61 can be formed in various forms such as a character, a figure, a symbol, etc.

The modification stage also has a meaning of a preparation stage, since it is a stage where the object 10*d* to be processed which is to be judged as a true product in the true-false judging stage is irradiated with light in advance for modification before moving to the distribution stage.

The distribution stage is a stage where the object 10*d* to be processed which has been irradiated with UV rays is distributed in the form of a product itself or an attachment to the product.

In this distribution stage, the object 10*d* to be processed has been irradiated with UV rays. However, since only a small change in transmissivity occurs in UV-irradiated parts, as for the change in tint of the irradiated part, there is no difference observed visually between the irradiated part and the non-irradiated part, which makes distinction between the UV-irradiated part and the non-irradiated part. Accordingly, if the forged distributed product 40 (a counterfeit product of the object 10*d* to be processed) which has not been irradiated with UV rays is distributed, it is impossible to distinguish visually this forged distributed product 40 from the object 10*d* to be processed.

The true-false judging stage is a stage where trueness of a product is judged by observing whether laser marking is made or not when an object 10*d* to be processed or the forged distributed product 40 is irradiated with laser light or whether the laser marking made has a predetermined shape or not.

For example, when an object is irradiated with laser light, if laser marking is made or the laser marking has a predetermined shape, this object for laser light irradiation can be judged as the object 10*d* to be processed which has been irradiated with UV light in advance. The object 10*d* to be processed itself or a product to which the object 10*d* to be processed is attached (an object to be judged) can be judged to be true.

When no laser marking is made even if an object is irradiated with laser light or when the laser marking is not in a predetermined shape, this object for irradiation is judged to be the forged distributed product 40 which has not been irradiated with UV rays. This forged distributed product 40 itself or a product to which the forged distributed product 40 is attached can be judged to be a counterfeit product.

If the entire object 10*d* to be processed is irradiated with UV rays without using the shield plate 60 in the modification stage, true and false objects are discriminated in the true-false judging stage by observing whether laser marking is made in the object 10*d* to be processed when laser is irradiated.

On the other hand, if a modified part having a predetermined shape is formed in the object 10*d* to be processed by irradiating UV rays through the shield plate 60, true and false objects are discriminated in the true-false judging stage by observing whether laser marking is made in the object 10*d* to be processed in that predetermined shape.

In this way, if a counterfeit product which has not been irradiated with UV rays is mixed in during the process in which the object 10*d* to be processed which has been irradiated with UV rays in advance is put on the market, true-false judgment can be conducted easily by confirming whether the laser marking is made or the laser marking is made in a predetermined shape.

Second Example

In the second example, an object to be processed or a forged distributed product is illuminated, and true-false judgment is made by observing whether the transmission light or the reflected light has a shade in a predetermined shape.

Figure 29:
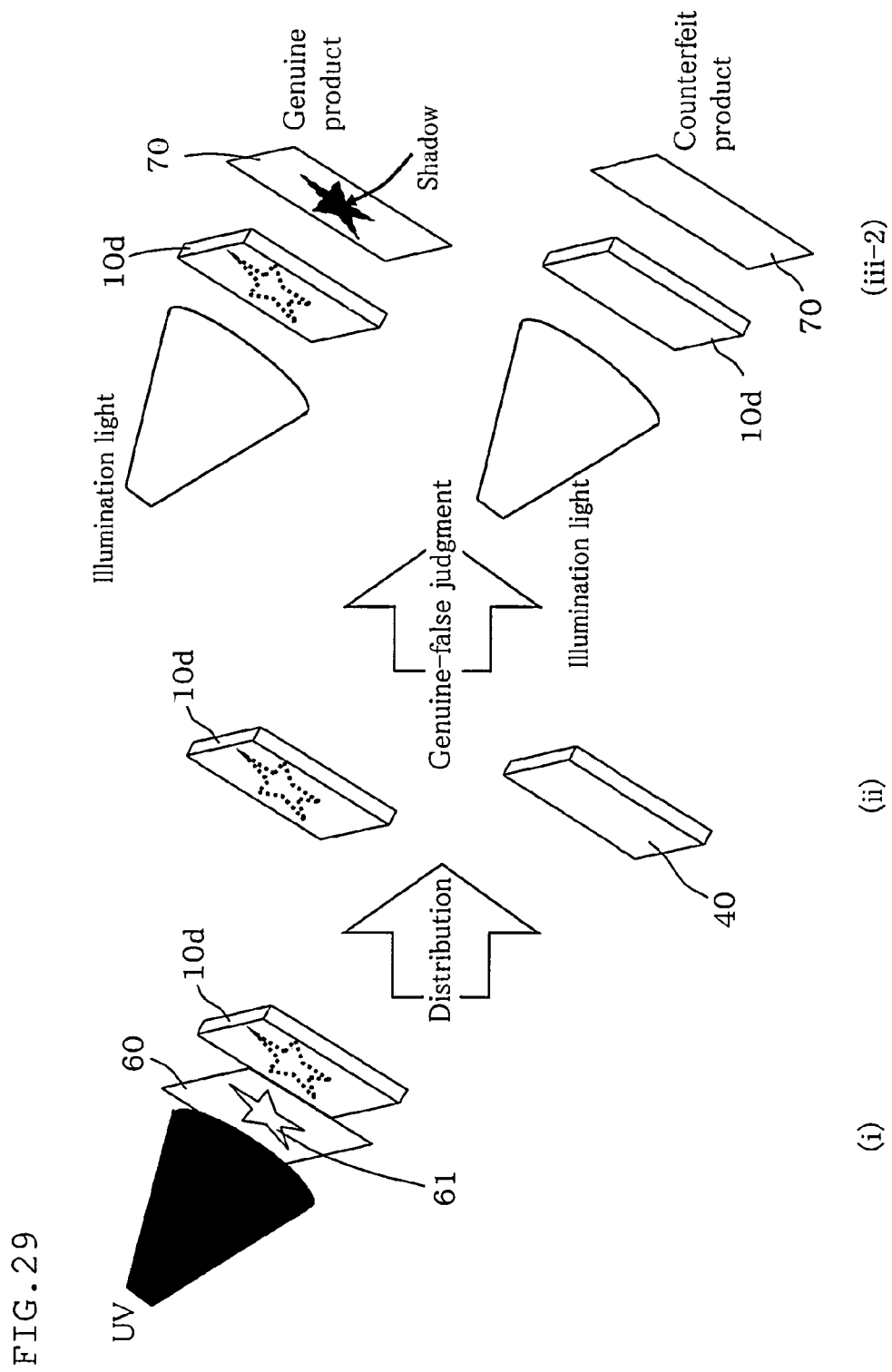
FIG. 29 is a diagrammatical view showing the procedure of the second example of the method for discriminating between true and false objects, in which (i) shows the stage of modification, (ii) shows the stage of distribution and (iii-2) shows the stage of discriminating between true and false objects.

As shown in FIG. 29, the method for discriminating between true and false objects of this example includes a modification stage (preparation stage, FIG. 29(i)), a distribution stage (FIG. 29(ii)) and a true-false judging stage (FIG. 29(iii-2)).

Here, the modification stage and the distribution stage are the same as the modification stage and the distribution stage in the First Example.

The true-false judging stage is a stage where trueness of a product is judged by observing whether the shade of the transmission light or the reflected light appears in a predetermined shape in an object 70 to be projected when the object 10d to be processed or the forged distributed product 40 (an object to be illuminated) is illuminated.

For example, if a shade appears in the object 70 to be projected and the dark shade thereof appears in a predetermined shape when an object to be illuminated is illuminated, this object to be illuminated can be judges to be the object 10d to be processed. The object 10d to be processed itself or a product to which the object 10d to be processed is attached (an object to be judged) is judged to be a true product.

On the other hand, if no shade appears in the object 70 to be projected even if the object is illuminated or the shade does not have a predetermined shape, the object to be illuminated can be judged as the forged distributed product 40. This forged distributed product 40 itself or a product to which the forged distributed product 40 is attached is judged to be a counterfeit product.

The reason for such judgment is as follows.

The object 10d to be processed, which is a true product, has been irradiated with UV rays in advance in a predetermined shape during the modification stage. Since this irradiated part has been modified, it has a higher absorptivity for light with a specific wavelength than other parts.

If the object 10d to be processed is irradiated with illumination light during the true-false judging stage, the modified part absorbs more light than other parts. Therefore, in the object 70 to be projected, a shadow according to the shape of the modified part is projected.

On the other hand, the forged distributed product 40, which is a counterfeit product, has not been irradiated with UV rays, and hence no modified part as that in the object 10d to be processed is present. Therefore, even the forged distributed product 40 is irradiated with illumination light in the true-false judging stage, no shade is projected in the object 70 to be projected.

An explanation is made on the specific example of this embodiment. Here, a case is explained where PET is used in the object 10d to be processed.

As compared with the unmodified part, the modified part of PET has improved absorptivity for light with a wavelength of around 355 nm (this wavelength is temporarily referred to as the "modified wavelength band"). Therefore, if the object to be judged is illuminated with light including the modified wavelength band, the amount of the transmission light or the reflection light is decreased in a part corresponding to the modified part. The true and false objects are discriminated by the presence or shape of this shade (that is, shadow).

Since the modified wavelength band is an invisible region at this time, judgment is conducted by means of image sensors, such as a camera. As for the illumination light used, even if it has the same wavelength as that of laser light, no processing as in the case of laser light is conducted since the light intensity thereof is low.

In this way, if a counterfeit product which has not been irradiated with UV rays is mixed in during the process in which the object 10d to be processed which has been irradiated with UV rays in advance is put on the market, true-false judgment can be conducted easily by illuminating the object 10d to be processed and by confirming whether the transmitted light or the reflected light has a shade.

As for the illumination light, any light may be used as long as it can illuminate the object brighter than the environment and the transmitted light or the reflected light has a shade. No restrictions are imposed on the illumination apparatus or the lower limitation value for the luminous intensity, luminance, illumination, light amount, and the like.

As for the object 70 to be projected, no restrictions are imposed on the material, shape, size, color or the like as far as it is a surface which can project the shade of the transmitted light or the reflected light.

Advantage of Second Example

The advantage of the Second Example will be explained with reference to FIG. 30.

Figure 30:
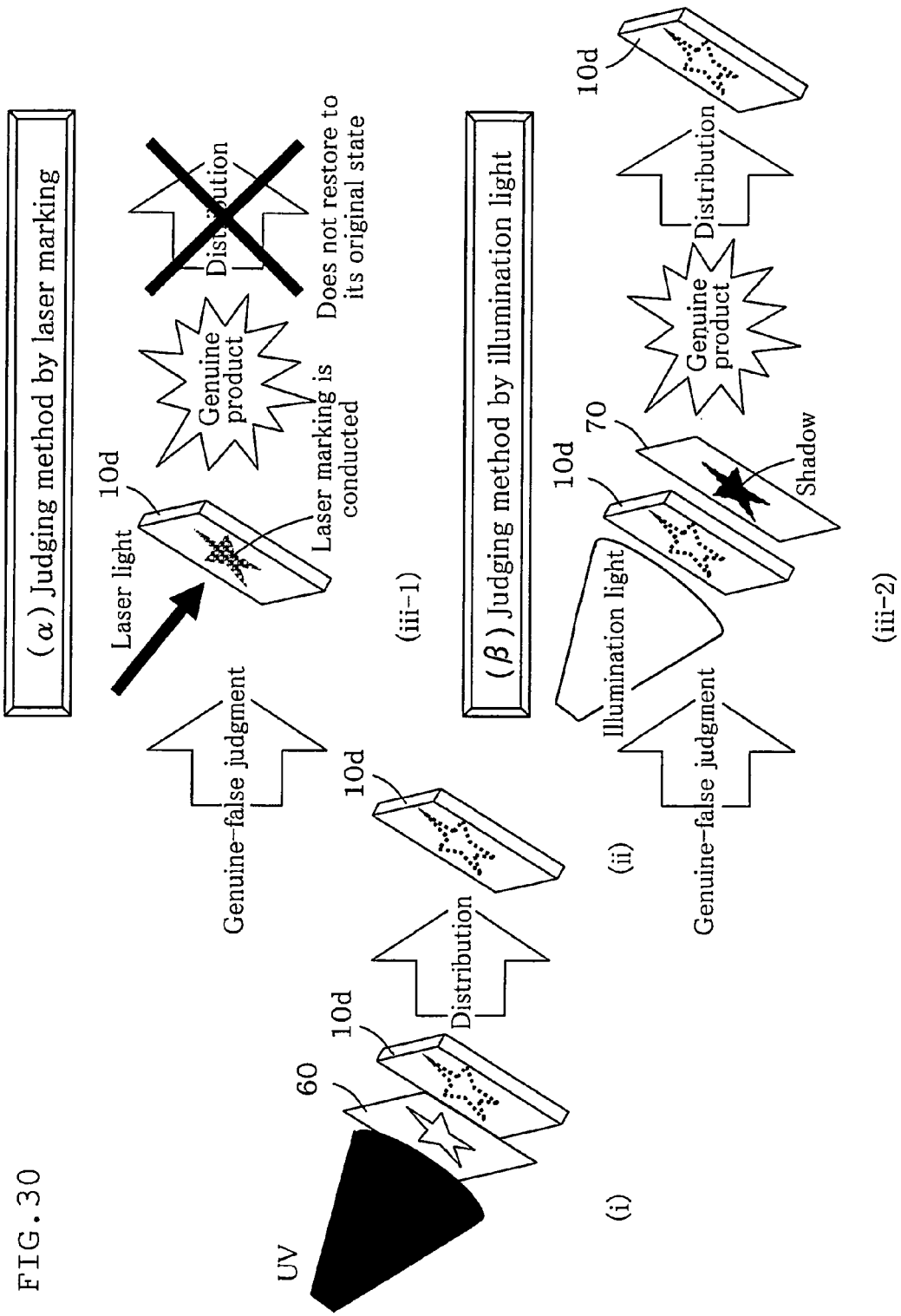
FIG. 30 is a diagrammatical view showing the procedure of each of the first example and the second example of the method for discriminating between true and false objects.

FIG. 30 is a view comparing the First Example and the Second Example regarding the method for discriminating between the true and false objects.

As shown in the figure, the First Example and the Second Example are the same in the modification stage (i) and the distribution stage (ii), but differs in the true-false judgment stage (iii).

As shown in FIG. 30($\alpha$) (judgment method by laser marking), in the true-false judgment stage (iii-1) of the First Example, trueness of a product is judged by observing whether marking is conducted in a predetermined shape when the object 10d to be processed is irradiated with laser light.

Here, since the laser marking is non-reversible, it is impossible to return an object to the original state once the laser marking is made. Therefore, the object to be processed or an object to which a laser-marked object is attached cannot be distributed.

On the other hand, as shown in FIG. 30($\beta$) (judgment method by illumination light), in the true-false judgment stage (iii-2) of this example, trueness of a product is judged by illuminating the object 10d to be processed and observing whether the transmitted light or the reflected light has a shade with a predetermined shape.

Here, the object 10d to be processed is just illuminated, and is not changed at all. Therefore, the object 10d to be processed can be distributed even after the true-false judgment stage (iii-2).

Thus, when the First Example and the Second Example are compared for the method for discriminating true and false objects, as the common advantageous effects, the capability of judging the trueness of a distributed product can be given. However, if the object 10d to be processed or a product to which this object is attached is put on the distribution process after judging, use of the Second Embodiment is desirable.

As mentioned hereinabove, according to the structural body, the method for forming a structural body, the laser processing method and the method for discriminating between true and false objects of this embodiment, since the outer layer of the structural body having a multilayer structure is formed of a resin which shows transmissibility for light with a specific wavelength and the inner layer is formed of a resin which shows non-transmissibility for light with the specific wavelength, a fine periodic structure can be formed in the interface of the inner layer by irradiating the laser light with such wavelength from the side of the outer layer.

Since this fine periodic structure has a regular arrangement which develops a structural color, it can develop a color like that of a hologram, and hence it can be used as a decoration from which a latent image appears.

Further, since the fine periodic structure is formed in the inner layer interface, the outer layer serves as a protective layer. As a result, the fine periodic structure can be prevented from being marred or fouled, whereby deterioration of color development can be avoided.

Further, since the outer layer serves as a protective layer, erasion or falsification of the marking which is a fine periodic structure becomes impossible. In addition, formation of a protective layer in a post-treatment becomes unnecessary.

In addition, in a structural body with a multilayer structure by forming a fine periodic structure respectively on the inner layer interface and the exposed surface of the outer layer, this structural body can be used for judging the trueness of a distributed product.

That is, a fine periodic structure is formed in the inner layer interface and the exposed surface of the outer layer of the structural body, a functional material is applied to or brought in contact with the fine periodic structure of the exposed surface of the outer layer, and when a color is developed by the fine periodic structure formed on the inner layer interface or it can be visually recognized that the fine periodic structure on the inner layer interface is formed in a predetermined shape, this structural body or a product having this structural body can be judged to be true.

Further, the structural body and the method for forming a structural body of this embodiment (hereinafter, simply referred to as the this embodiment") has the following properties as compared with the technology disclosed in Patent Document 1 mentioned in the Back Ground Art (hereinafter, referred to as the "document technology").

For example, in this embodiment, as the technology of marking, laser light including UV rays is irradiated to allow abrasion (photodecomposition, evaporation) to be caused, whereby a fine periodic structure is formed in the inner layer interface. On the other hand, in the document technology, laser light including infrared rays is irradiated to cause a phenomenon such as carbonization, foaming and evaporation to conduct marking.

Here, carbonation requires the adjustment of the amount of oxygen, forming implies possibility of destroying the multilayer structure, and evaporation by infrared rays is hard to be used as marking due to a low contrast.

On the other hand, the technology of this embodiment is a technology of forming the fine periodic structure shown in FIGS. 4 to 7 on the inner layer interface simply without fail by irradiating an object to be processed with laser light with a specific wavelength including UV rays in an interference region of a plurality of light flux. In this embodiment, no problem associated with the carbonation or the like of the document technology occurs.

Moreover, in the document technology, formed marking develops only specific colors such as black, white, brown and gray. On the other hand, in this embodiment, a fine periodic structure is formed in the inner layer interface, whereby a rainbow structural color is developed. Therefore, this embodiment proposes a new rainbow color developing technology replacing the conventional hologram.

As mentioned above, according to the structural body, the method for forming a structural body, the laser processing method and the method for discriminating between true and false objects, by irradiating an object to be processed formed of transparent plastic with light including UV rays (UV) with a wavelength of 400 nm or less, thereby to modify the object to be processed, the object to be processed has a larger absorption of laser light, whereby laser making can be conducted more easily.

Further, since a light-absorbing agent disclosed in Patent Document 2, a light-absorbing solution disclosed in Patent Document 3 or the like is not used, simplification of the laser marking process and the reduction of cost can be attained.

In addition, by using a concealed marking which appears only in a UV irradiated part, the structural body can be imparted with a forging prevention function.

The preferred embodiment of the structural body, the method for forming a structural body, the laser processing method and the method for discriminating true and false objects of the present invention are explained hereinabove, however, the structural body, the method for forming a structural body, the laser processing method and the method for discriminating true and false objects of the present invention are not limited to the above-mentioned embodiments or examples, and it is needless to say various modifications are possible within the scope of the invention.

For example, although a plate-like structural body is shown in the above-mentioned embodiment, the structural body is not limited to one in the shape of a plate, and the structural body can be formed into various shapes such as a curved surface shape, a mountain shape, a wavy shape, a cylindrical shape and a square pillar shape.

Moreover, polyethylene terephthalate (PET) is mentioned as the material of the object to be processed in the above-mentioned embodiment. However, the material is not limited to PET. For example, a high-molecular compound, such as polystyrene, polyethylene, polypropylene, polycarbonate, nylon resin, an acrylic resin, vinyl chloride resin, and phenol resin, etc. can be used as the material. Moreover, polyester compounds such as polyethylene naphthalate (PEN), polybutylene terephthalate (PBT), polytrimethylene terephthalate (PTT), etc. can be used as the material. However, these materials are required to allow the periodic structure 14 to be formed by irradiation of laser light.

Furthermore, in the above-mentioned embodiment of the method for discriminating between true and false objects, although the trueness of a product is judged by observing whether laser marking is formed, the method of judgment is not limited thereto, and, for example, even when laser marking is conducted, if the laser making is not in a predetermined shape, the product can be judged as a counterfeit product.

Hereinabove, an explanation was made on laser making as the specific laser processing. However, the present case is considered to be a laser processing method which is effective for other laser processing such as boring and cutting. In this case, in particular, a thin object to be processed is most suitable.

INDUSTRIAL APPLICABILITY

Since the present invention is an invention which relates to a structural body or a method for discriminating between true and false objects utilizing the structural body, it can be used for an article using the structural body, a commodity which is required to be subjected to true-false judgment or the like.

EXPLANATION OF SYMBOLS

10(10a, 10b, 10c) Structural body
10d Object to be processed
11 Outer layer
11-1 First outer layer
11-2 Second outer layer
12 Inner layer
12-1 First inner layer
12-2 Second inner layer 13,13-11,13-12 Surface nearer to the outer layer
13-21 Surface nearer to the first outer layer
13-22 Surface nearer to the second outer layer
14,14-11,14-12,14-21,14-22 Fine periodic structure
18 Exposed surface
20 Laser light irradiation apparatus
30 Object to be processed
40 Forged distributed product
50 Functional material
60 Shielding plate
61 Opening

The invention claimed is:

1. A structural body comprising:
an inner layer formed of a resin which does not transmit light with a specific wavelength;
an outer layer stacked on the inner layer and formed of a resin which transmits the light with said specific wavelength; and
a fine periodic structure provided on at least part of a surface of said inner layer facing said outer layer and having a plurality of photodecomposition generated convex and concave portions,
wherein the plurality of convex and concave portions of the fine periodic structure is formed alternatively, and horizontally and vertically with substantially equal intervals in between along the surface of the inner layer facing the outer layer.

2. The structural body according to claim 1, wherein the fine periodic structure has a regular arrangement which develops a structural color.

3. The structural body according to claim 1, wherein said light which generates photodecomposition includes ultraviolet light.

4. The structural body according to claim 1, which has a high-molecular compound which transmits laser light in at least part thereof,
wherein at least part of said high-molecular compound is irradiated with light to modify and enhance absorptivity of said laser light, and the modified high-molecular compound is used as one layer of the multilayer structural body.

5. The structural body according to claim 4, wherein a fine periodic structure is formed in said modified part by laser light irradiation, and
the fine periodic structure comprises a plurality of convex and concave portions formed alternatively, and horizontally and vertically with substantially equal intervals in between along the surface of the high-molecular compound.

6. The structural body according to claim 1, wherein the fine periodic structure is a modified part irradiated with ultraviolet light to increase an absorptivity of a laser light and irradiated with the laser light to form the plurality of convex and concave portions.

7. The structural body according to claim 1, wherein at least part of the outer layer comprises a high-molecular compound transmitting a laser light, and the inner layer comprises a high-molecular compound not transmitting the laser light; and
the inner layer is irradiated with ultraviolet light to increase an absorptivity of the laser light, and is irradiated with the laser light to form the fine periodic structure having the plurality of convex and concave portions.

8. A structural body comprising:
an outer layer formed of a resin which transmits light with a specific wavelength,
a plurality of inner layers formed of different resins stacked together and disposed on the outer layer, at least one of the inner layers being formed of a resin which does not transmit light with the specific wavelength, and
a fine periodic structure formed on at least part of a surface of said at least one of the inner layers facing the outer layer and having a plurality of photodecomposition generated convex and concave portions,
wherein the plurality of convex and concave portions of the fine periodic structure is formed alternatively, and horizontally and vertically with substantially equal intervals in between along the surface of the inner layer facing the outer layer.

9. The structural body according to claim 8, wherein the fine periodic structure has a regular arrangement which develops a structural color.

10. The structural body according to claim 8, wherein said light which generates photodecomposition includes ultraviolet light.

11. A structural body comprising:
an inner layer formed of a resin which does not transmit light with a specific wavelength;
an outer layer stacked on both surfaces of the inner layer, and having a first outer layer formed on one surface of said inner layer and a second outer layer formed on another surface of the inner layer, at least one of the outer layers being formed of a resin which transmits the light with said specific wavelength; and
a fine periodic structure having a plurality of photodecomposition generated convex and concave portions formed on at least part of a surface opposed to the first outer layer and/or on at least part of a surface opposed to the second outer layer,
wherein the plurality of convex and concave portions of the fine periodic structure is formed alternatively, and horizontally and vertically with substantially equal intervals in between along the surface of the inner layer facing the outer layer.

12. The structural body according to claim 11, wherein the fine periodic structure has a regular arrangement which develops a structural color.

13. The structural body according to claim 11, wherein said light which generates photodecomposition includes ultraviolet light.

14. A structural body comprising:
a plurality of inner layers stacked together and formed of resins different from each other, at least one of the inner layers being formed of a resin which does not transmit light with a specific wavelength,
a first outer layer formed on one side of said inner layers and a second outer layer formed on another side of said inner layers, the first outer layer and/or the second outer layer being formed of a resin which transmits light with the specific wavelength,
a fine periodic structure formed on at least part of a surface of the inner layers facing the first outer layer or at least part of a surface facing the second layer, and having a plurality of photodecomposition generated convex and concave portions,
wherein the plurality of convex and concave portions of the fine periodic structure is formed alternatively, and horizontally and vertically with substantially equal intervals in between along the surface of the inner layer facing the outer layer.

15. The structural body according to claim 14, wherein the fine periodic structure has a regular arrangement which develops a structural color.

16. The structural body according to claim 14, wherein said light which generates photodecomposition includes ultraviolet light.

17. A method for forming a structural body, comprising:
preparing a structural body having at least an outer layer formed of a resin which transmits light with a specific wavelength, an inner layer formed of a resin which does not transmit the light with said specific wavelength,
irradiating the structural body with the light with said specific wavelength through said outer layer to said inner layer, and generating photodecomposition in at least part of a surface of said inner layer facing said outer layer to form fine periodic structure having a plurality of convex and concave portions,
wherein the plurality of convex and concave portions of the fine periodic structure is formed alternatively, and horizontally and vertically with substantially equal intervals in between thereof along the outer surface of the inner layer.

18. A method for forming a structural body according to claim 17, wherein a laser oscillator outputs laser light with said specific wavelength, a beam splitter divides said laser light into a plurality of light fluxes, a light-condensing element forms an interference region by allowing said plurality of light fluxes to be intersected, and said structural body is arranged in said interference region, whereby said fine periodic structure is formed.

19. The method for forming a structural body according to claim 17, wherein said laser light includes ultraviolet rays.

20. The method for forming a structural body according to claim 17, in which
the structural body has at least part thereof made of a high-molecular compound which transmits laser light,
said at least part of said high-molecular compound is irradiated with light to modify said at least part of said high-molecular compound, and
said modified part is irradiated with said laser light to conduct a predetermined processing.

21. The method for forming a structural body according to claim 20, wherein the light to modify said at least part of said high-molecular compound includes UV rays with a wavelength of 400 nm or less.

22. The method for forming a structural body according to claim 20, wherein the modified part is irradiated with said laser light at a periodic intensity distribution, whereby a fine periodic structure is formed on the surface of said modified part.

23. The method for forming a structural body according to claim 20, wherein the modified part is irradiated with said light through a shielding plate having an opening formed in the shape of a character or a figure.

24. A method for forming a structural body according to claim 17, wherein the inner layer is irradiated with ultraviolet light to increase an absorptivity of the laser light, and is irradiated with the laser light to form the fine periodic structure having the plurality of convex and concave portions.

* * * * *